(12) United States Patent
Gonzalez et al.

(10) Patent No.: US 11,208,133 B1
(45) Date of Patent: Dec. 28, 2021

(54) CART

(71) Applicant: Southwire Company, LLC, Carrollton, GA (US)

(72) Inventors: Juan Alberto Galindo Gonzalez, Powder Springs, GA (US); Richard Mike Temblador, Carrollton, GA (US); Allan W. Daniel, Woodland, AL (US); Daniel Irvin, Villa Rica, GA (US); Franklin Calhoun, Carrollton, GA (US); Laurentiu Dragomir, Atlanta, GA (US); James Phillip Tuggle, Carrollton, GA (US); Jeffrey D. Herrin, Carrollton, GA (US); Joseph Gerardo, Victorville, GA (US); John R. Carlson, Newnan, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/356,741

(22) Filed: Mar. 18, 2019

Related U.S. Application Data

(60) Division of application No. 14/016,364, filed on Sep. 3, 2013, now Pat. No. 10,232,868, which is a
(Continued)

(51) Int. Cl.
*B62B 3/10* (2006.01)
*B65D 85/04* (2006.01)
(Continued)

(52) U.S. Cl.
CPC .............. *B62B 3/104* (2013.01); *B65D 85/04* (2013.01); *B65D 88/08* (2013.01); *B65D 90/0033* (2013.01); *B65D 2203/00* (2013.01)

(58) Field of Classification Search
CPC ........... B62B 1/264; B62B 3/104; B62B 3/04; B62B 2202/022; B62B 2202/02;
(Continued)

(56) References Cited

U.S. PATENT DOCUMENTS

| 83,341 A | 10/1868 | Towndrow |
| 745,833 A | 12/1903 | Hanson |

(Continued)

FOREIGN PATENT DOCUMENTS

| EP | 1693126 A1 | 6/2005 |
| WO | 2001/28906 A1 | 4/2001 |
| WO | 2006/037395 A1 | 4/2006 |

OTHER PUBLICATIONS

Copending U.S. Appl. No. 16/488,022, filed Sep. 30, 2019 entitled "Method For Laying Multiple Conductors in a Container".
(Continued)

*Primary Examiner* — Glenn F Myers
(74) *Attorney, Agent, or Firm* — Merchant & Gould P.C.

(57) ABSTRACT

A cart may be provided for use in moving a container that houses one or more conductors. The cart may comprise a support member, one or more wheels, and a receiving member. The wheel or wheels may be connected to the support member. The receiving member may be attached to the support member. The receiving member may be freely slideable along the support member.

20 Claims, 34 Drawing Sheets

Related U.S. Application Data continuation-in-part of application No. 13/938,454, filed on Jul. 10, 2013, now Pat. No. 9,145,219, which is a division of application No. 13/849,018, filed on Mar. 22, 2013, now Pat. No. 8,936,153, which is a continuation-in-part of application No. 13/464,168, filed on May 4, 2012, now abandoned.

(60) Provisional application No. 61/695,620, filed on Aug. 31, 2012.

(51) Int. Cl.
*B65D 88/08* (2006.01)
*B65D 90/00* (2006.01)

(58) Field of Classification Search
CPC ........ B62B 2202/021; B62B 2202/028; B62B 1/14; B62B 1/142; B62B 2203/00; B62B 2203/02; B62B 2203/40; B62B 2203/42; B62B 2203/44; B62B 2203/455; B66F 9/187; B66F 9/186; B66F 9/184; B65D 90/0033; B65D 2203/00; B65D 2203/02; B65D 2203/40; B65D 2203/42; B65D 2203/44; B65D 2203/455
USPC ....... 414/457, 444, 451, 618, 450, 452, 455, 414/456
See application file for complete search history.

(56) References Cited

U.S. PATENT DOCUMENTS

| | | | | |
|---|---|---|---|---|
| 993,008 A * | 5/1911 | West | ................ | B62B 1/264 414/450 |
| 1,403,404 A | 1/1922 | Grumpelt | | |
| 1,553,963 A * | 9/1925 | Swartsel | ................ | B62B 1/264 414/452 |
| 1,649,940 A | 11/1927 | Willmot | | |
| 1,915,843 A | 6/1933 | Wright | | |
| 1,926,836 A | 9/1933 | Corlett | | |
| 1,974,862 A | 9/1934 | Cryan | | |
| 2,077,349 A * | 4/1937 | Hobbis | ................ | B62B 1/264 414/450 |
| 2,239,222 A | 4/1941 | Funke | | |
| 2,249,051 A | 7/1941 | Schulse | | |
| 2,620,997 A | 12/1942 | Lyon | | |
| 2,330,909 A | 10/1943 | Olson | | |
| 2,490,837 A | 12/1949 | Scott | | |
| 2,497,440 A | 2/1950 | Denny | | |
| 2,580,900 A | 1/1952 | Epstein | | |
| 2,610,812 A | 9/1952 | Epstein | | |
| 2,713,938 A | 7/1955 | Snyder | | |
| 2,736,512 A | 2/1956 | Drummond | | |
| 2,765,090 A | 10/1956 | Halls | | |
| 2,803,337 A | 8/1957 | Lee | | |
| 2,826,322 A * | 3/1958 | Posehn | ................ | B66F 9/187 414/607 |
| 2,854,245 A | 9/1958 | Manahan | | |
| 2,869,719 A | 1/1959 | Hubbard | | |
| 2,895,691 A | 7/1959 | Foler | | |
| 2,903,147 A | 9/1959 | Davis, Jr. | | |
| 2,912,763 A | 11/1959 | Loewe et al. | | |
| 3,000,493 A | 9/1961 | Hirst | | |
| 3,011,735 A | 12/1961 | Lachat | | |
| 3,081,893 A | 3/1963 | Holsclaw | | |
| 3,082,868 A | 3/1963 | Hubbard | | |
| 3,114,456 A | 12/1963 | Van Billiard | | |
| 3,278,061 A | 10/1966 | Christensen | | |
| 3,298,631 A | 1/1967 | Richardson, Jr. | | |
| 3,369,687 A | 2/1968 | Walls | | |
| 3,473,489 A | 10/1969 | Sargent | | |
| 3,485,458 A | 12/1969 | Evans | | |
| 3,491,876 A | 1/1970 | Zecchin | | |
| 3,602,455 A | 8/1971 | Lewis | | |
| 3,642,301 A | 2/1972 | Crawford | | |
| 3,674,164 A | 7/1972 | Kaufman | | |
| 3,711,111 A | 1/1973 | Crawford | | |
| 3,722,825 A | 3/1973 | Phillips | | |
| 3,815,844 A | 6/1974 | Wright et al. | | |
| 3,819,847 A | 6/1974 | Charles | | |
| 3,868,033 A * | 2/1975 | Le Duff | ................ | B65G 65/23 414/648 |
| 3,902,679 A * | 9/1975 | Bost | ................ | B65H 49/02 242/129 |
| 4,018,468 A | 4/1977 | Lundquist | | |
| 4,202,509 A | 5/1980 | Horn | | |
| 4,213,536 A | 7/1980 | Hafner | | |
| 4,257,729 A | 3/1981 | Morissette | | |
| 4,444,313 A | 4/1984 | Tyson | | |
| 4,509,702 A | 4/1985 | Reese | | |
| 4,512,431 A | 4/1985 | Bloomfield | | |
| 4,582,198 A | 4/1986 | Ditton | | |
| 4,588,318 A * | 5/1986 | O'Brien | ................ | B05C 17/0308 239/578 |
| 4,664,260 A | 5/1987 | Stokes | | |
| 4,680,068 A | 7/1987 | Hofstettler et al. | | |
| 4,741,659 A | 5/1988 | Berg | | |
| 4,981,412 A | 1/1991 | Hawkins | | |
| 5,022,603 A | 6/1991 | Maree et al. | | |
| 5,033,520 A | 7/1991 | Kuehmichel | | |
| 5,129,593 A | 7/1992 | Smith | | |
| D329,561 S | 9/1992 | Nyorkor | | |
| 5,275,349 A | 1/1994 | Tussing | | |
| 5,277,314 A | 1/1994 | Cooper et al. | | |
| 5,406,996 A * | 4/1995 | Wagner | ................ | B66F 9/06 141/364 |
| 5,499,775 A | 3/1996 | Vander Groef | | |
| 5,641,947 A | 6/1997 | Riddle, Jr. | | |
| 5,642,811 A | 7/1997 | Hübner et al. | | |
| 5,707,021 A | 1/1998 | Bitts | | |
| 5,738,209 A | 4/1998 | Burr | | |
| 5,746,380 A | 5/1998 | Chung | | |
| 5,758,834 A | 6/1998 | Dragoo et al. | | |
| 5,816,514 A | 10/1998 | Duclos et al. | | |
| 5,879,068 A | 3/1999 | Menashrov et al. | | |
| 5,967,362 A | 10/1999 | Corbin | | |
| 6,016,911 A | 1/2000 | Chen | | |
| 6,129,796 A | 10/2000 | Steinberg et al. | | |
| 6,209,725 B1 | 4/2001 | Chen | | |
| 6,499,284 B2 | 12/2002 | Chern | | |
| 6,530,584 B1 | 3/2003 | Lucy | | |
| 6,662,963 B1 | 12/2003 | Meike et al. | | |
| 6,683,555 B2 | 1/2004 | Carlson | | |
| 6,702,077 B2 | 3/2004 | Skowronski | | |
| 6,857,521 B2 | 2/2005 | Cantu-Gonzalez | | |
| 6,882,898 B2 | 4/2005 | Fore, Sr. et al. | | |
| 6,889,835 B2 | 5/2005 | Land | | |
| 6,966,701 B2 | 11/2005 | Schelbert | | |
| 7,004,419 B2 | 2/2006 | Hsu | | |
| 7,025,300 B2 | 4/2006 | Glassey | | |
| 7,076,985 B2 | 7/2006 | Rex | | |
| 7,100,863 B2 | 9/2006 | Hsu et al. | | |
| 7,161,097 B1 | 1/2007 | Gorgone | | |
| 7,185,838 B2 | 3/2007 | Mullebrouck | | |
| 7,399,017 B1 | 7/2008 | Lasseigne | | |
| 7,520,120 B2 | 4/2009 | Saito | | |
| 7,798,180 B2 | 9/2010 | Kazuaki et al. | | |
| 7,798,326 B2 | 9/2010 | Hsu | | |
| 7,866,586 B2 | 1/2011 | Fabian | | |
| 8,157,201 B2 | 4/2012 | Galgano | | |
| 8,235,210 B2 | 8/2012 | DeLacerda | | |
| 8,366,126 B2 | 2/2013 | Galgano et al. | | |
| 8,387,909 B2 | 3/2013 | Galgano et al. | | |
| 8,662,003 B1 | 3/2014 | Cooper et al. | | |
| 8,746,607 B2 | 6/2014 | LaForest | | |
| 8,936,153 B1 | 1/2015 | Temblador et al. | | |
| 9,145,219 B1 | 9/2015 | Temblador et al. | | |
| 9,796,494 B1 | 10/2017 | Temblador et al. | | |
| 9,867,300 B1 | 1/2018 | Fowler | | |
| 10,232,686 B2 | 3/2019 | Gonzalez | | |
| 10,356,924 B1 | 7/2019 | Fowler, Jr. | | |
| 10,427,816 B1 | 10/2019 | Temblador | | |
| 10,554,025 B2 | 2/2020 | Fowler | | |

(56) References Cited

U.S. PATENT DOCUMENTS

| | | | |
|---|---|---|---|
| 10,843,830 B1 | 11/2020 | Temblador et al. | |
| 2001/0006184 A1 | 7/2001 | Ohike et al. | |
| 2001/0039464 A1* | 11/2001 | Hackauf | B66F 9/184 700/213 |
| 2002/0113162 A1 | 8/2002 | Fournier | |
| 2002/0168259 A1* | 11/2002 | McConnell | B62B 1/142 414/490 |
| 2003/0089818 A1 | 5/2003 | Reau | |
| 2003/0230660 A1 | 12/2003 | Vemam | |
| 2003/0230667 A1 | 12/2003 | Ganster | |
| 2004/0177642 A1 | 9/2004 | Citrynell et al. | |
| 2005/0074317 A1 | 4/2005 | Escorza et al. | |
| 2005/0127233 A1 | 6/2005 | Hsu et al. | |
| 2005/0263640 A1 | 12/2005 | Vanderslice | |
| 2006/0056947 A1* | 3/2006 | Posly | B66F 9/06 414/419 |
| 2006/0102771 A1 | 5/2006 | Kimura | |
| 2006/0196989 A1 | 9/2006 | Bartley | |
| 2006/0249611 A1 | 11/2006 | Carroscia et al. | |
| 2007/0045141 A1 | 3/2007 | Gelmetti | |
| 2007/0175786 A1 | 8/2007 | Nicklas | |
| 2008/0023358 A1 | 1/2008 | Otto | |
| 2008/0236102 A1 | 10/2008 | Murakami et al. | |
| 2010/0124476 A1 | 5/2010 | Berlinger | |
| 2010/0164191 A1 | 7/2010 | Kinnen et al. | |
| 2011/0174763 A1 | 7/2011 | Kennedy | |
| 2011/0259467 A1 | 10/2011 | Maness | |
| 2012/0168554 A1 | 7/2012 | Blunt et al. | |
| 2012/0234713 A1 | 9/2012 | Nicklas | |
| 2013/0032597 A1 | 2/2013 | Anderson | |
| 2013/0119184 A1 | 5/2013 | Ma et al. | |
| 2013/0313377 A1 | 11/2013 | Struck, II | |
| 2013/0334166 A1 | 12/2013 | Garipalli et al. | |
| 2014/0145408 A1* | 5/2014 | Midas | B62B 3/0606 280/47.131 |
| 2014/0319438 A1* | 10/2014 | Carlson | B62B 3/02 254/2 R |
| 2015/0014468 A1 | 1/2015 | Carlson et al. | |
| 2015/0225205 A1 | 8/2015 | Fleury | |
| 2017/0063057 A1 | 3/2017 | Fowler et al. | |

OTHER PUBLICATIONS

U.S. Office Action dated Mar. 22, 2019 U.S. Appl. No. 15/254,051; 9 pgs.

Copending U.S. Appl. No. 14/016,364, filed Sep. 3, 2013 entitled "Cart and Container".

Copending U.S. Appl. No. 15/789,100, filed Oct. 20, 2017 entitled "Method for Laying Multiple Conductors in a Container".

Copending U.S. Appl. No. 15/828,899, filed Dec. 1, 2017 entitled "Multiple Conductor Container".

U.S. Office Action dated May 1, 2015 U.S. Appl. No. 14/016,364, 49 pgs.

U.S. Final Office Action dated Dec. 17, 2015 U.S. Appl. No. 14/016,364, 18 pgs.

U.S. Office Action dated Sep. 29, 2016 U.S. Appl. No. 14/016,364, 21 pgs.

U.S. Final Office Action dated May 31, 2017 U.S. Appl. No. 14/016,364, 28 pgs.

U.S. Office Action dated Jan. 5, 2018 U.S. Appl. No. 14/016,364, 29 pgs.

U.S. Office Action dated Jul. 26, 2018 U.S. Appl. No. 15/828,899; 25 pgs.

U.S. Office Action dated Dec. 28, 2018 U.S. Appl. No. 15/789,100; 25 pgs.

Co-Pending U.S. Appl. No. 16/780,096, filed Feb. 3, 2020 entitled "Conductor Identification".

U.S. Office Action dated Mar. 3, 2020 U.S. Appl. No. 16/588,022; 21 pgs.

U.S. Office Action dated Jul. 7, 2021 U.S. Appl. No. 17/075,842; 24 pages.

Co-Pending U.S. Appl. No. 17/075,842, filed Oct. 21, 2020 entitled "Method for Laying Multiple Conductors in a Container".

\* cited by examiner

100

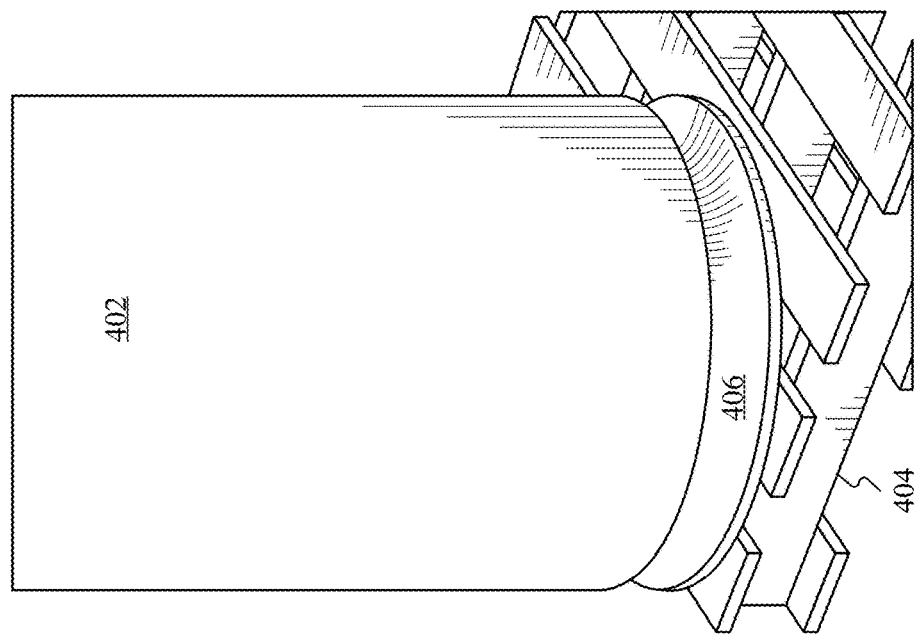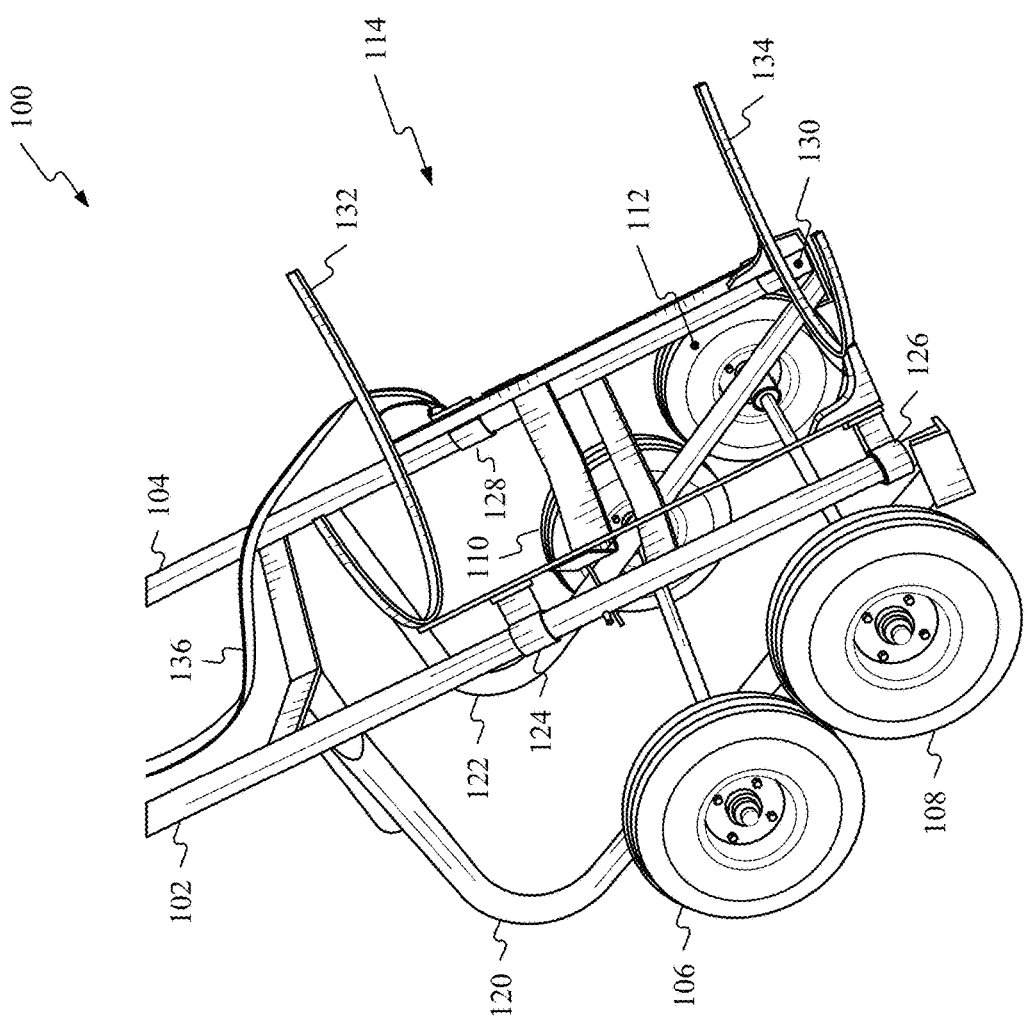
FIG. 4A

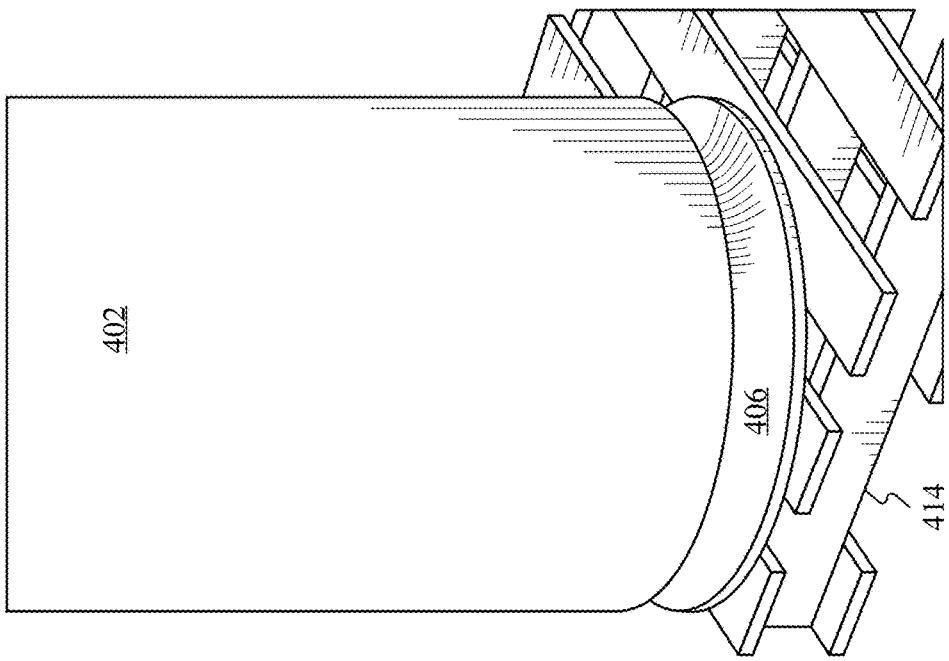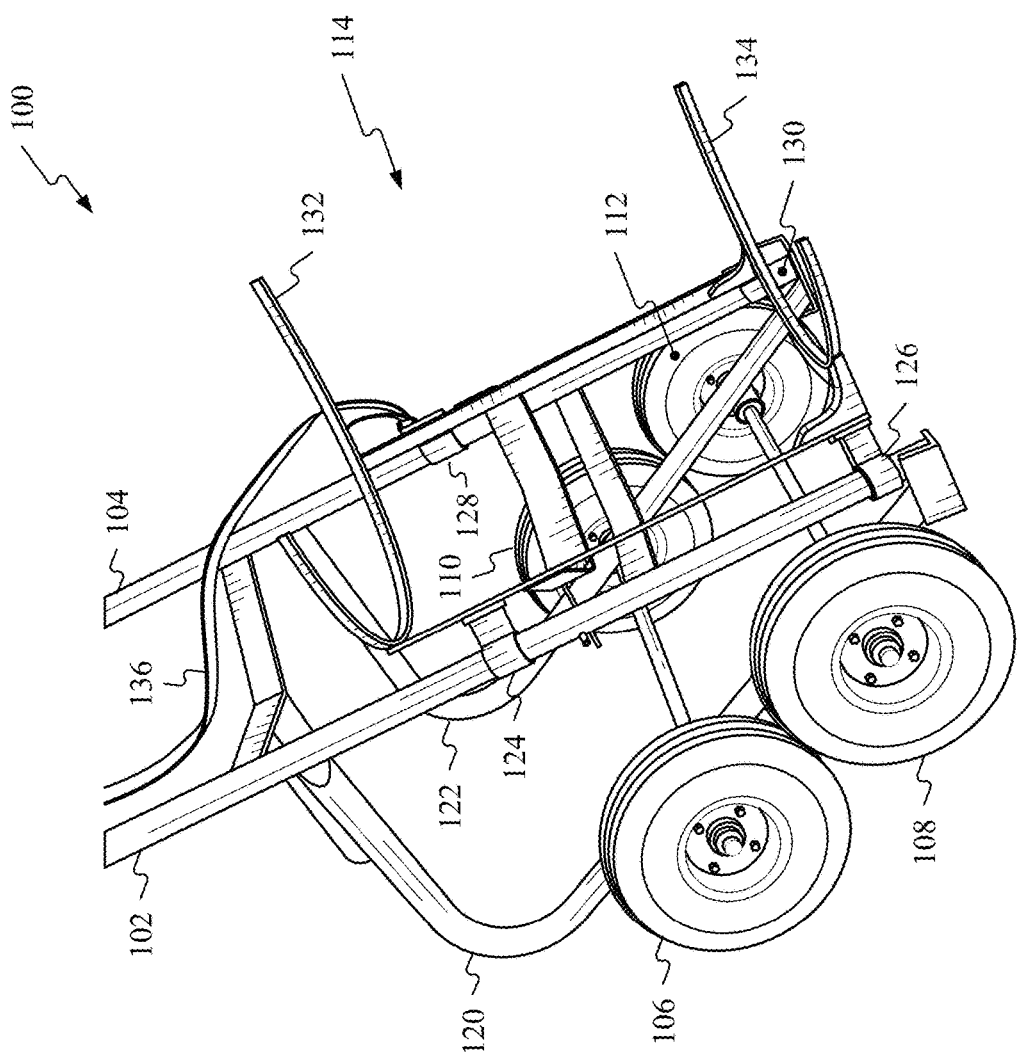
FIG. 4M

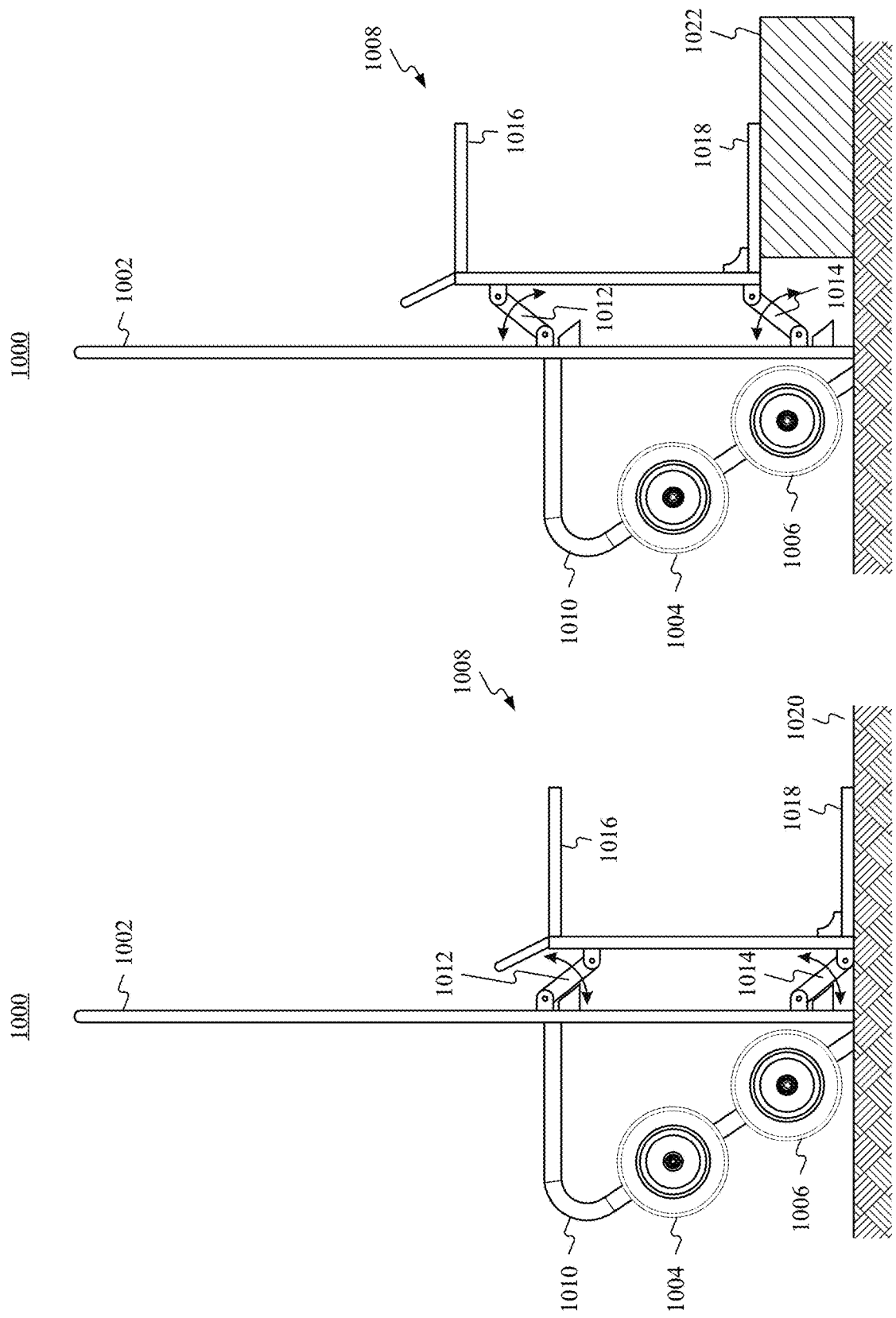

US 11,208,133 B1

CART

CROSS-REFERENCE TO RELATED APPLICATIONS

This application is a divisional application of U.S. application Ser. No. 14/016,364, filed Sep. 3, 2013, now U.S. Pat. No. 10,232,868, which claims the benefit of U.S. Provisional Application No. 61/695,620, filed on Aug. 31, 2012 under the provisions of 35 U.S.C. § 119(e), both applications of which are incorporated herein by reference. In addition, application Ser. No. 14/016,364 is a continuation-in-part (CIP) of U.S. application Ser. No. 13/938,454, filed Jul. 10, 2013, now U.S. Pat. No. 9,145,219, which is incorporated herein by reference. U.S. application Ser. No. 13/938,454 is a divisional application of U.S. application Ser. No. 13/849,018, filed on Mar. 22, 2013, now U.S. Pat. No. 8,936,153, which is incorporated herein by reference. U.S. application Ser. No. 13/849,018 is a continuation-in-part (CIP) of U.S. application Ser. No. 13/464,168, filed on May 4, 2012, which is incorporated herein by reference.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Handling a container or drum with a conventional container lift or cart requires a user to tilt the container or drum to allow the forks of the container cart to slide under the container or drum. Containers or drums can hold materials with a weight up to 800 pounds. Therefore, two to three persons are required to safely engage the container with the cart, one or two to lean on the container and lift one side off the floor, and a second to slide the cart or forklift forks under it.

BRIEF DESCRIPTION OF THE DRAWINGS

The accompanying drawings, which are incorporated in and constitute a part of this disclosure, illustrate various embodiments of the present invention. In the drawings:

FIGS. 4A through 4M show the stages of a method for receiving and removing a container from a cart;
FIGS. 10A and 10B show a cart.

DESCRIPTION

Figure 1:
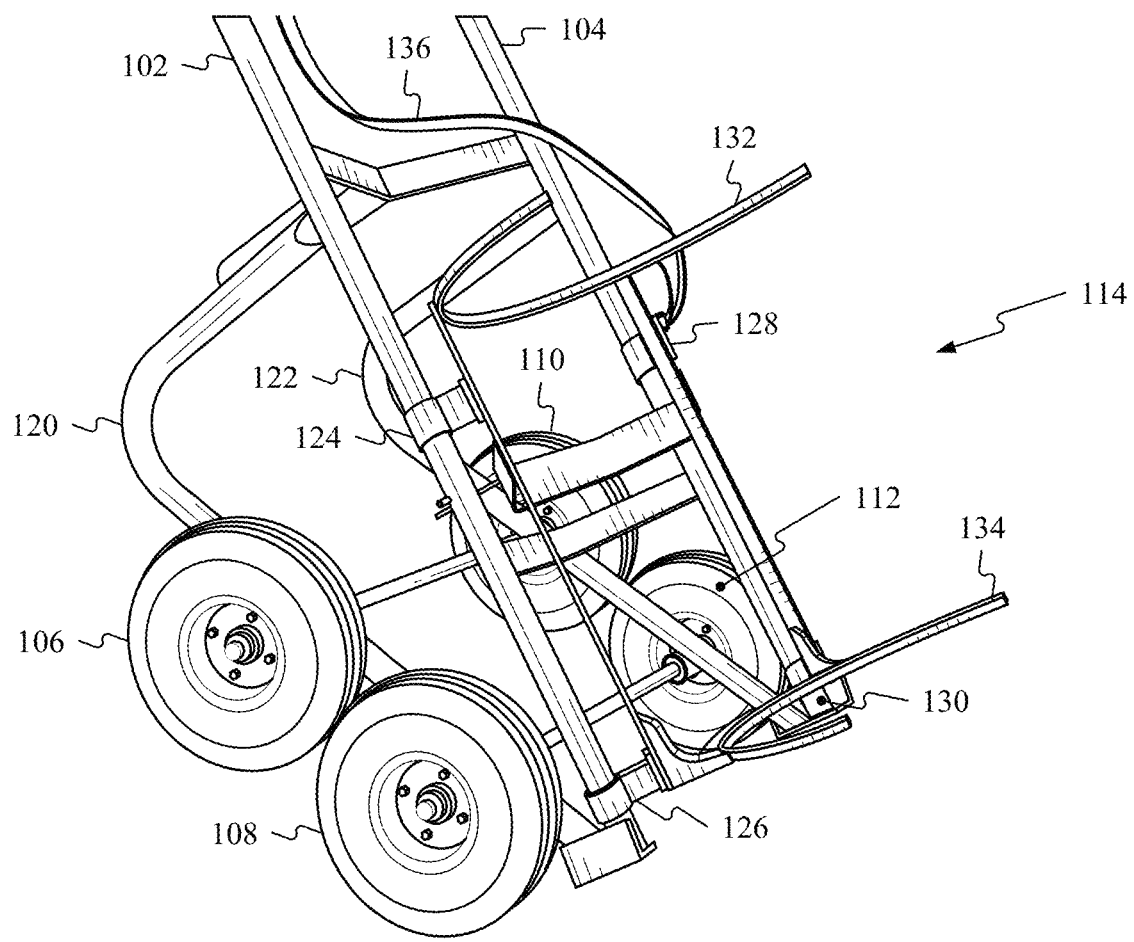
FIGS. 1-3 show a cart.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a cart may be provided. The cart may comprise a support member, one or more wheels, and a receiving member. The wheel or wheels may be connected to the support member. The receiving member may be attached to the support member. The receiving member may be freely slideable along the support member.

Consistent with embodiments of the invention, a container may be provided. The container may comprise a container and a base. The container may define a volume that may house a length of conductors. A conductor may be any material that may conduct electricity, light, or any signal. Examples of a conductor may include copper wire, a fiber optic cable, and aluminum wire. Example lengths of conductors housed in the container may include, 500 feet, 2,500 feet, and 5,000 feet. The base may be connected to the container. The base and container may define an indentation along a perimeter where the container and the base meet.

Figure 2:
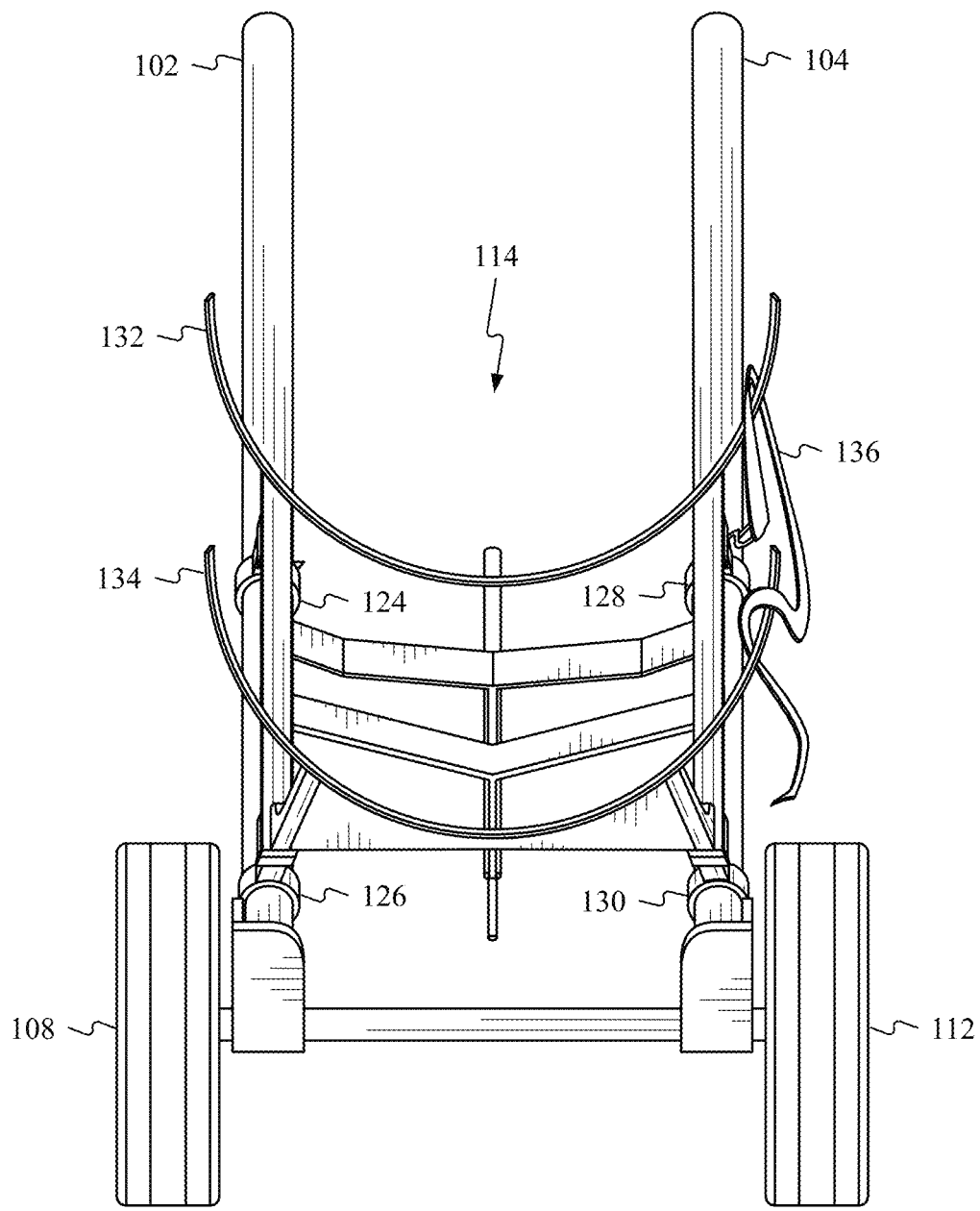
Figure 3:
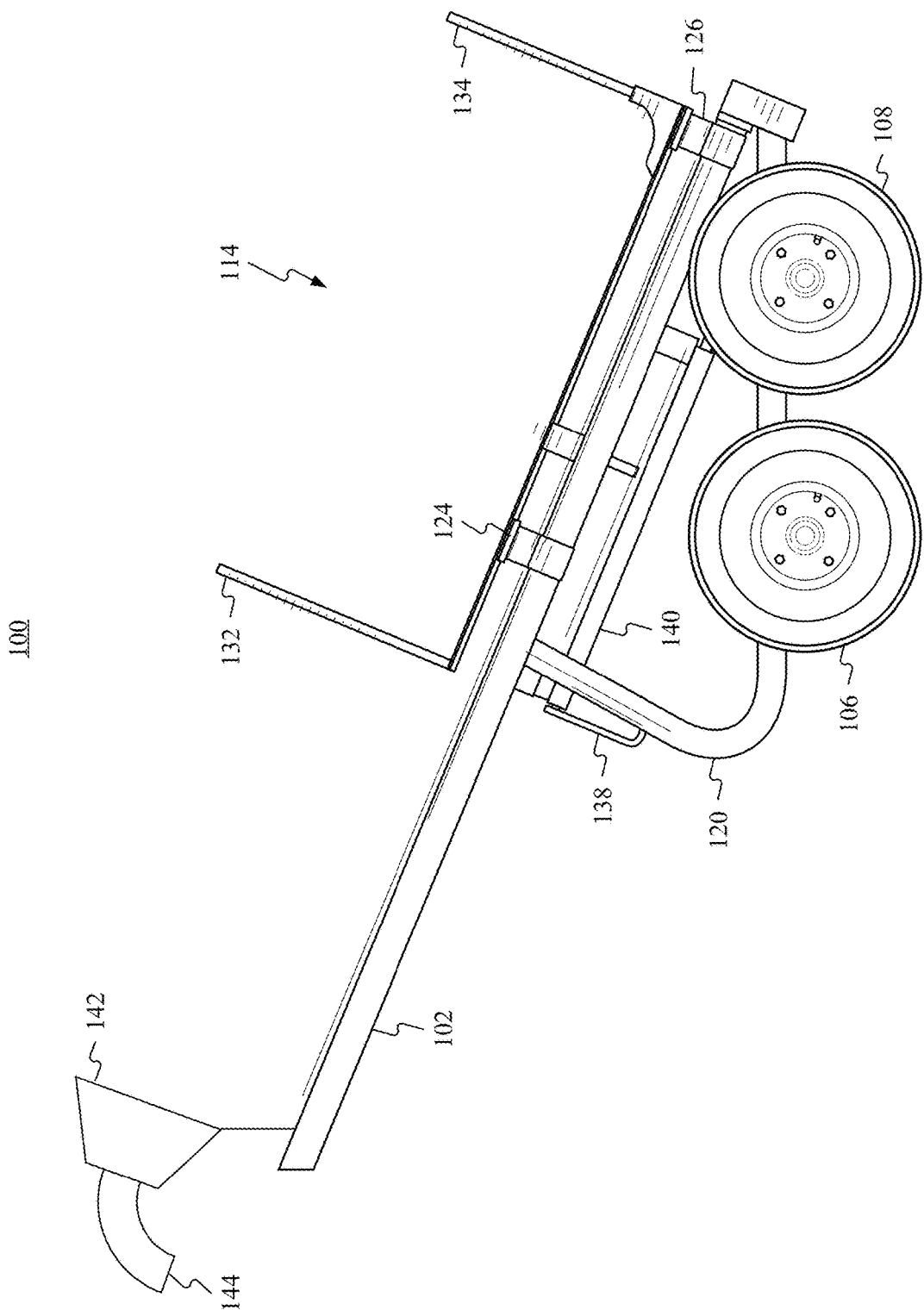

FIGS. 1-3 show an embodiment of a cart 100. Cart 100 may comprise a first support member 102, a second support member 104, a first wheel 106, a second wheel 108, a third wheel 110, a fourth wheel 112, and a receiving member 114. First wheel 106 and second wheel 108 may be connected directly to first support member 102 or may be connected to cart 100 via a first angled connection member 120. Third wheel 110 and fourth wheel 112 may be connected directly to second support member 104 or may be connected to cart 100 via a second angled connection member 122. While FIGS. 1-3 show four wheels, any number of wheels may be utilized to move the cart.

Receiving member 114 may be connected via one or more of a plurality of sliding members. The plurality of sliding members may comprise, but are not limited to, a first sliding member 124, a second sliding member 126, a third sliding member 128, and a fourth sliding member 130. Receiving member 114 may be connected to first support member 102 via first sliding member 124 and second sliding member 126. Receiving member 114 may be connected to second support member 104 via third sliding member 128 and fourth sliding member 130. While FIGS. 1-3 show four sliding members, any number of sliding members may be utilized to connect receiving member 114 to first support member 102 and second support member 104. The sliding members may include, for example, bearings, grease plugs, and other friction reducing elements to facilitate receiving member 114's movement along first support member 102 and second support member 104.

Ones of the plurality of sliding members may completely encircle first support member 102 and second support member 104 or they may partially encircle first support member 102 and second support member 104. For example, first sliding member 124 and second sliding member 126 may fully encircle first support member 102, and third sliding member 128 and fourth sliding member 130 may partially encircle second support member 104. This configuration may allow receiving member 114 to pivot about first support member 102. In other words, first sliding member 124 and second sliding member 126 may act as hinges that may allow receiving member 114 to rotate about first support member 102. In addition, receiving member 114 may be detachable from first support member 102 and second support member 104 when the sliding members do not fully encircle first support member 102 and second support member 104.

Receiving member 114 may include an upper fork 132 and a lower fork 134. Upper fork 132 and lower fork 134 may be curved (i.e., curved receivers) to match a profile of a container. For example, upper fork 132 may receive an upper portion of the container and lower fork 134 may receive a lower portion of the container. In addition, upper fork 132 and lower fork 134 may comprise tines that may extend and lock into place to better secure the container to cart 100. For instance, upper fork 132 and lower fork 134 may be constructed of a tubular or other hollow stock. The tines may extend and retract into upper fork 132 and lower fork 134. The tines may have a curved profile. As the tines extend from upper fork 132 and lower fork 134, the tines may wrap around the container or other item located proximate receiving member 114. The tines may be held in place by a pin that may pass through the tines and upper fork 132 and lower fork 134. In addition, the tines may have a protrusion that may act as a handle or grip. The protrusion may engage notches or groves located in upper fork 132 and lower fork 134 to secure the tines in place. In addition, a strap 136 may be used to better secure the container to cart 100.

A hook 138 (see FIG. 3) may be used to grip the container. During operation, hook 138 may extend and retract from a tube 140. Hook 138 may catch an indentation or band located on the container. As cart 100 is tilted rearward, hook 138 may catch the container and allow a user to apply greater leverage to the container.

A wire guide 142 (see FIG. 3) may be attached to cart 100. Consistent with embodiments, wire guide 142 may be attached to first support member 102, second support member 104, or receiving member 114. Wire guide 142 may have a fixed position or it may be movable. For example, wire guide 142 may have a fixed position along first support member 102. For instance, wire guide 142 may be welded to first support member 102. Wire guide 142 may be movable along first support member 102. For instance, first support member 102 may have a plurality of holes drilled into it. Wire guide 142 may have a peg that may be inserted into one of the plurality of holes to allow a user to reposition wire guide 142 as desired. In addition, wire guide 142 may comprise a snout 144. Snout 144 may be rotatable, flexible, ridged, and removable.

Wire guide 142 may facilitate removal of the conductors from the container. Wire guide 142 may also include additional features not shown such as a twister and devices that may braid or bind conductors as they are removed from the container. Wire guide 142 may provide the conductors a smooth transition away from the container by providing a common path for the conductors to travel. The common path may help minimize tangling of the conductors. In addition, wire guide 142 may allow the conductors to be pulled from the container without damage to the conductors. Wire guide 142 may comprise a locking mechanism (not shown) that may comprise a choking member located internal or external to wire guide 142. The choking member may hinder the conductors from traveling back into the container. For instance, during operation an electrician may pull conductors (e.g., wires or cables) through wire guide 142. The choking member may then prevent the conductors from slipping back into the container. This may prevent the electrician from having to feed the conductors though wire guide 142 every time he cuts the conductors.

Figure 4B:
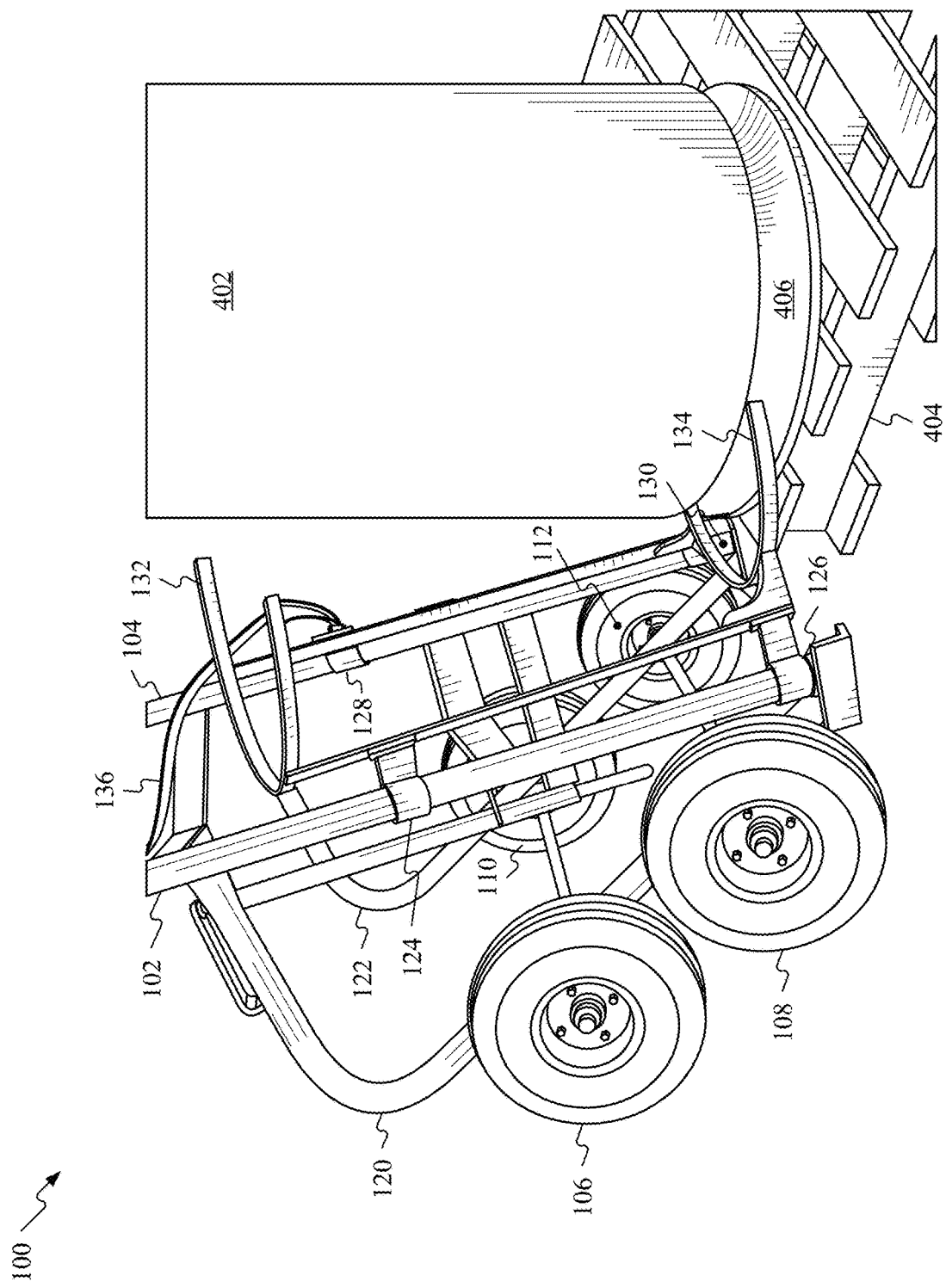

FIG. 4A through FIG. 4M illustrate an embodiment of cart 100's operation. FIG. 4A shows cart 100 approaching a container 402. Container 402 may be located on an elevated surface (e.g., a first pallet 404) and comprise a base 406. Cart 100 may be maneuvered while on two or four wheels. During initial movement of cart 100, receiving member 114 may be in a lower position as shown in FIG. 4A. The lower position may comprise the lowest position that receiving member 114 can be in along first support member 102 and second support member 104.

FIG. 4B shows that as cart 100 approaches container 402, lower fork 134 may contact base 406. Upon initial contact with base 406, receiving member 114 may be in the lower position. Base 406 and container 402 may define an indentation (e.g. indentation 1204 described in more detail below with respect to FIG. 12A and FIG. 12B) along a perimeter where the container and the base meet. Lower fork 134 may slide into the indentation. As lower fork 134 makes contact with base 406 and the bottom of container 402, receiving member 114 may begin to traverse (e.g. slide) up first support member 102 and second support member 104.

Figure 4C:
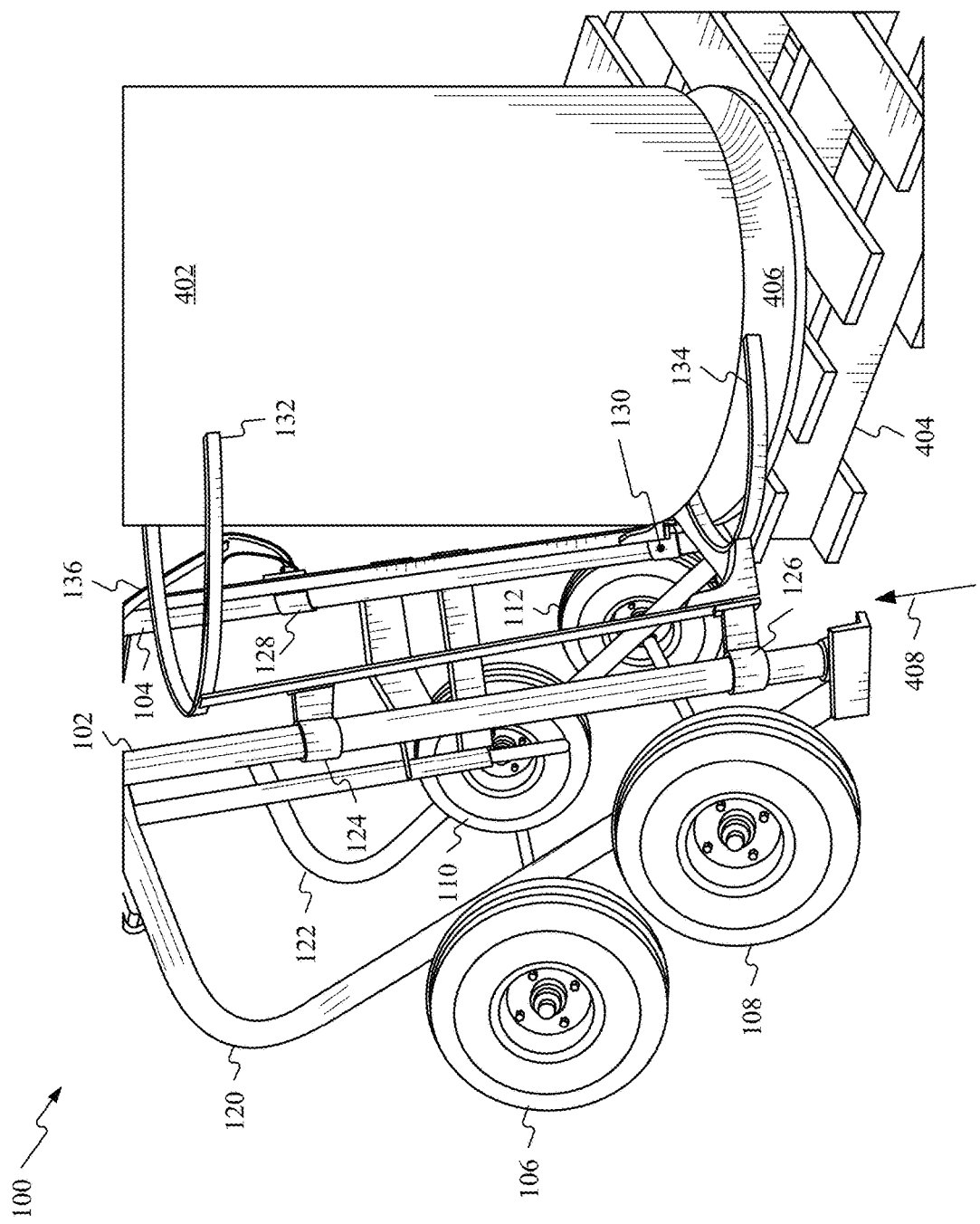

FIG. 4C shows as cart 100 further approaches container 402, receiving member 114 may be partially coupled to container 402. As receiving member 114 gets closer to base 406, base 406 may apply a force to lower fork 134 that may cause receiving member 114 to traverse up first support member 102 and second support member 104 as indicated by arrow 408. As shown in FIG. 4B through FIG. 4C, cart 100's angle relative to container 402 may begin to decrease. In other words, as receiving member 114 increases its contact with container 402 and traverses the support members, cart 100 may approach a more vertical position. The movement of receiving member 114 may be accomplished only due to the force exerted on lower fork 134 by base 406. The freely sliding nature of receiving member 114 may mean that receiving member 114's movement may not be accomplished or assisted by elements such as, for example, springs, shocks, motors, or actuators. Receiving member 114's ability to traverse first support member 102 and second support member 104 may allow cart 100 to receive container 402's elevated surfaces without having to lift cart 100 off the ground.

Figure 4D:
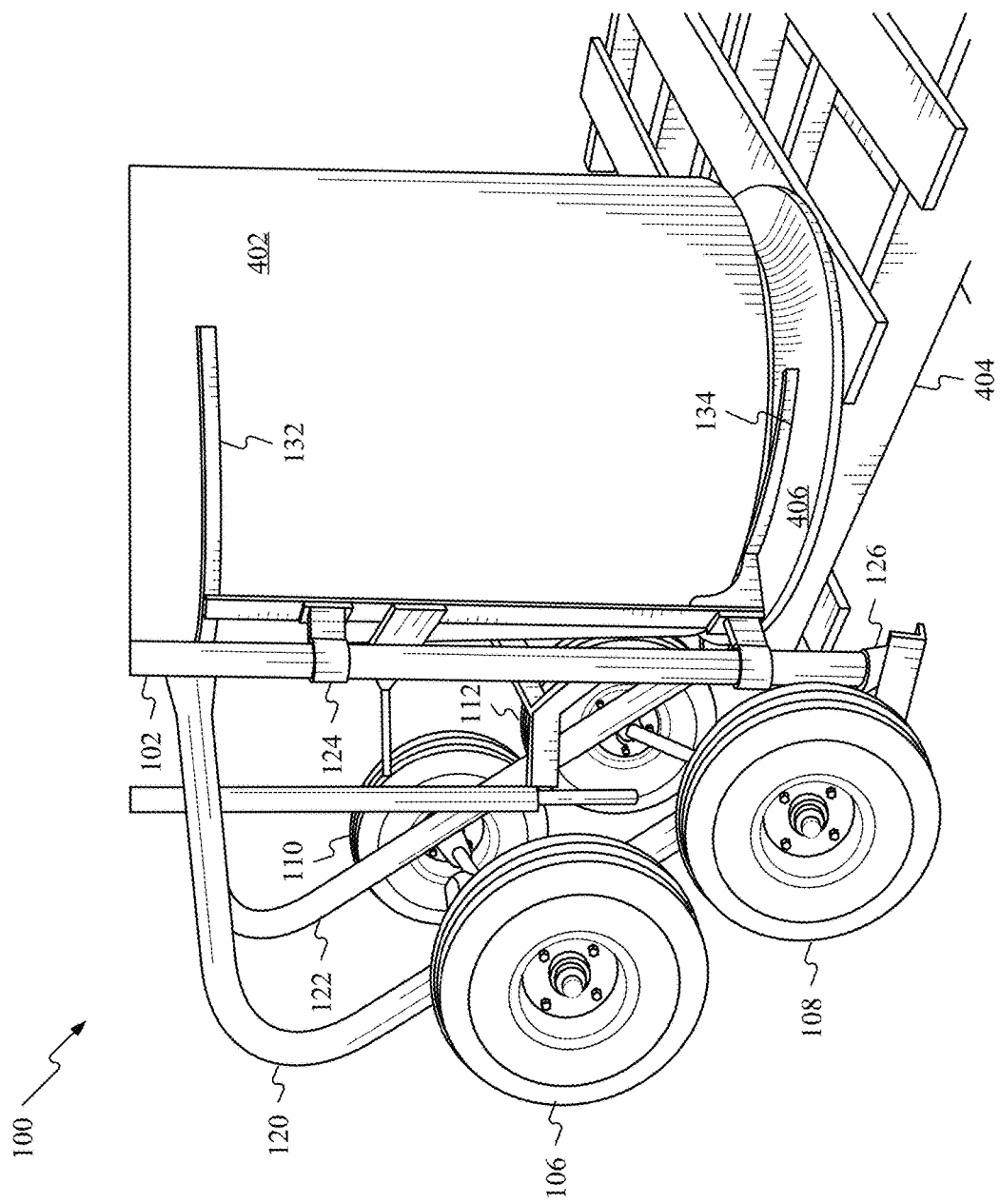

FIG. 4D shows upper fork 132 receiving container 402. In other words, cart 100 has reached a near vertical position and receiving member 114 contacts container 402. As a result, receiving member 114 has traversed from the lower position to an upper position without the assistance of elements such as springs, shocks, motors, or actuators. Note that this traversal may be accomplished by an operator rolling cart 100 on its wheels into the position shown in FIG. 4D. The height of the upper position may be a function of the height of first pallet 404. In other words, if first pallet 404 were taller or shorter than shown in FIG. 4D, the upper position would be correspondingly different.

Figure 4E:
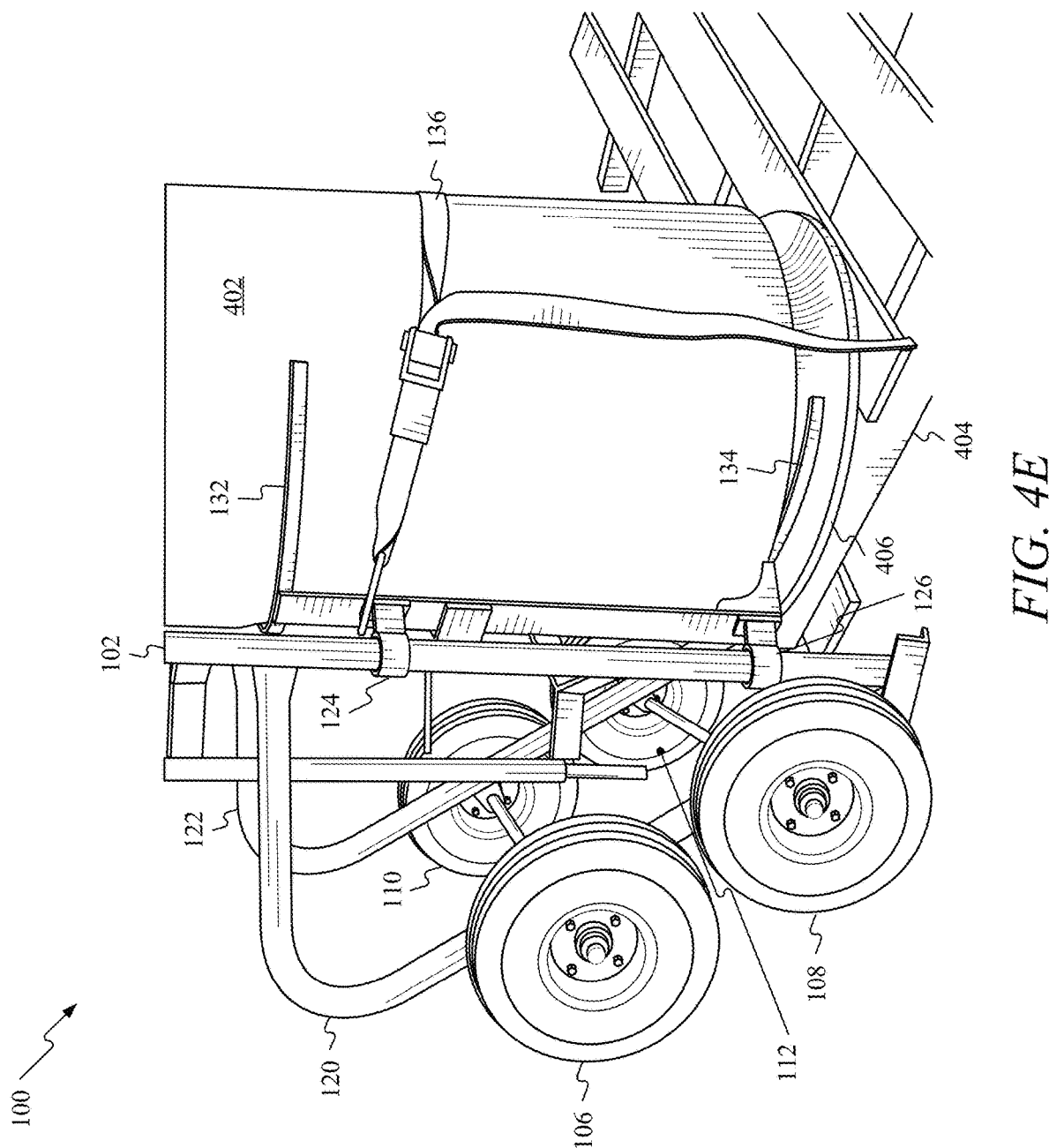

FIG. 4E shows that after upper fork 132 has received container 402, strap 136 may be utilized to secure container 402 to receiving member 114. In addition, tines may be extended from upper fork 132 and lower fork 134. The tines may have a curved profile. As the tines extend from upper fork 132 and lower fork 134, the tines may wrap around container 402. The ends points of the tines may connect to one another to secure container 402 to cart 100. Furthermore, strap 136 may be connected to the tines and secure container 402 to receiving member 114. Hook 138 may be secured to a top portion of container 402 and may allow for greater leverage to be applied to container 402 when cart 100 is tilted back.

Figure 4F:
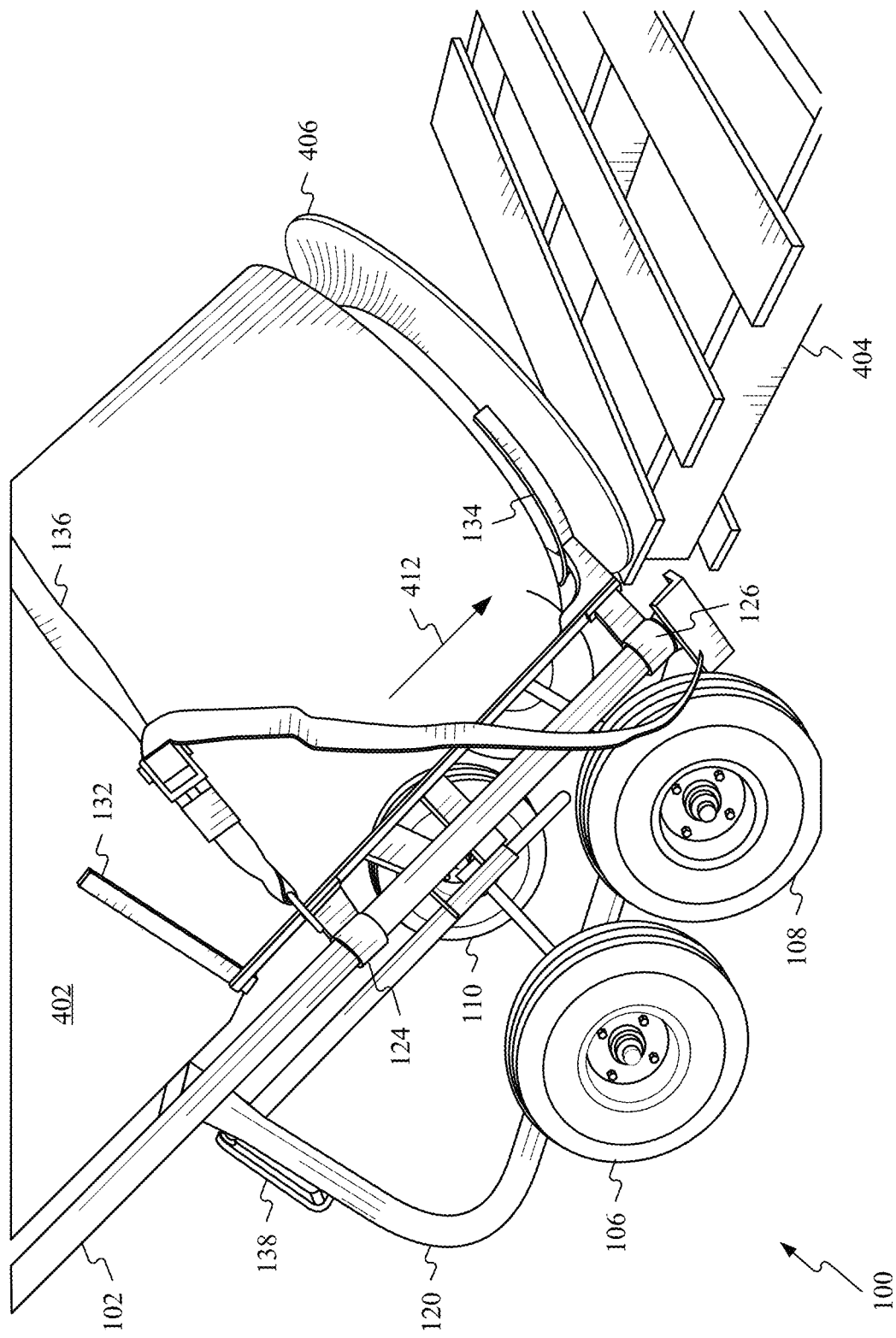

Once strap 136 has secured container 402 to receiving member 114, container 402 may be lifted from first pallet 404. To lift container 402 from first pallet 404, cart 100 may be tilted back such that first wheel 106, second wheel 108, third wheel 110, and fourth wheel 112 contact the ground as shown in FIG. 4F. As cart 100 is being tilted back, receiving member 114 may traverse first support member 102 and second support member 104 as indicated by arrow 412 from the upper position back down to the lower position. Due to the free floating nature of receiving member 114, its movement indicated by arrow 412 may occur without the assistance of elements such as, for example, springs, shocks, motors, or actuators.

Figure 4G:
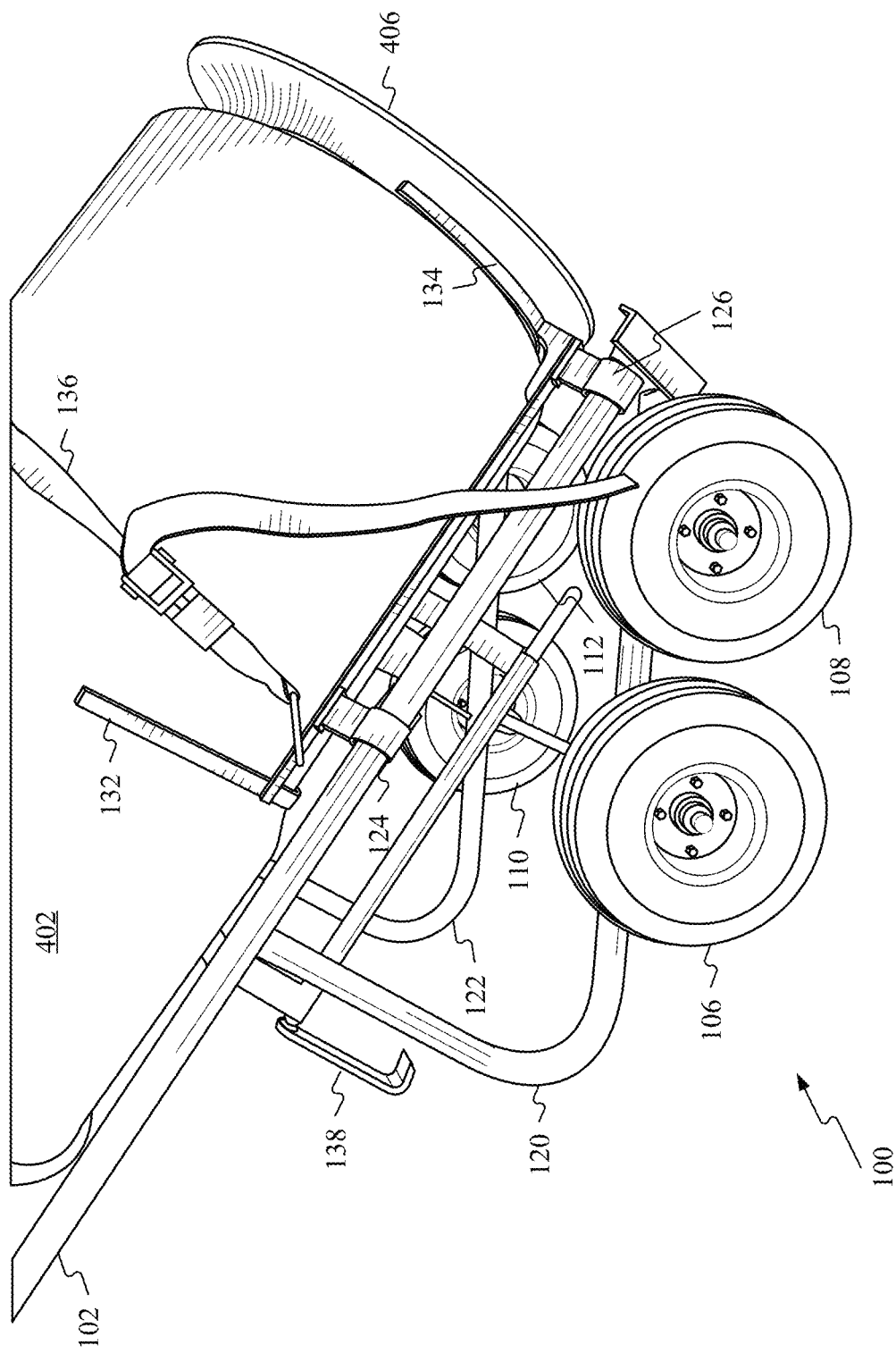

After container 402 is lifted from first pallet 404, FIG. 4G shows that container 402 may be transported using cart 100 to a new location. The operator may roll cart 100 on the wheels with container 402 attached to the new location. Note that receiving member 114 is in the lower position.

Figure 4H:
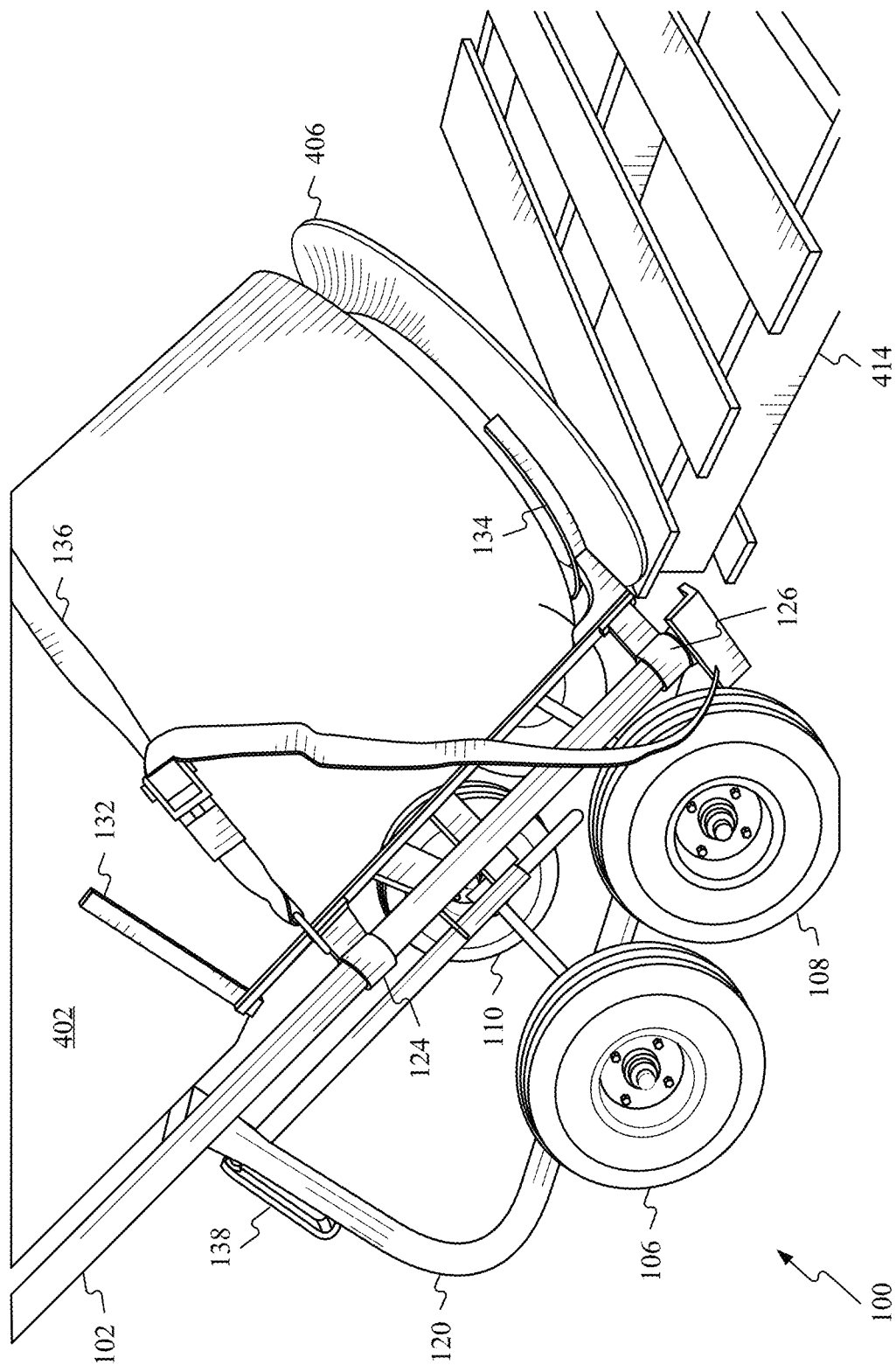

As shown in FIG. 4H, after transporting container 402 to the new location, cart 100 may approach a second elevated surface (e.g., a second pallet 414). Note that receiving member 114 is in the lower position as cart 100 approaches the second elevated surface.

Figure 4I:
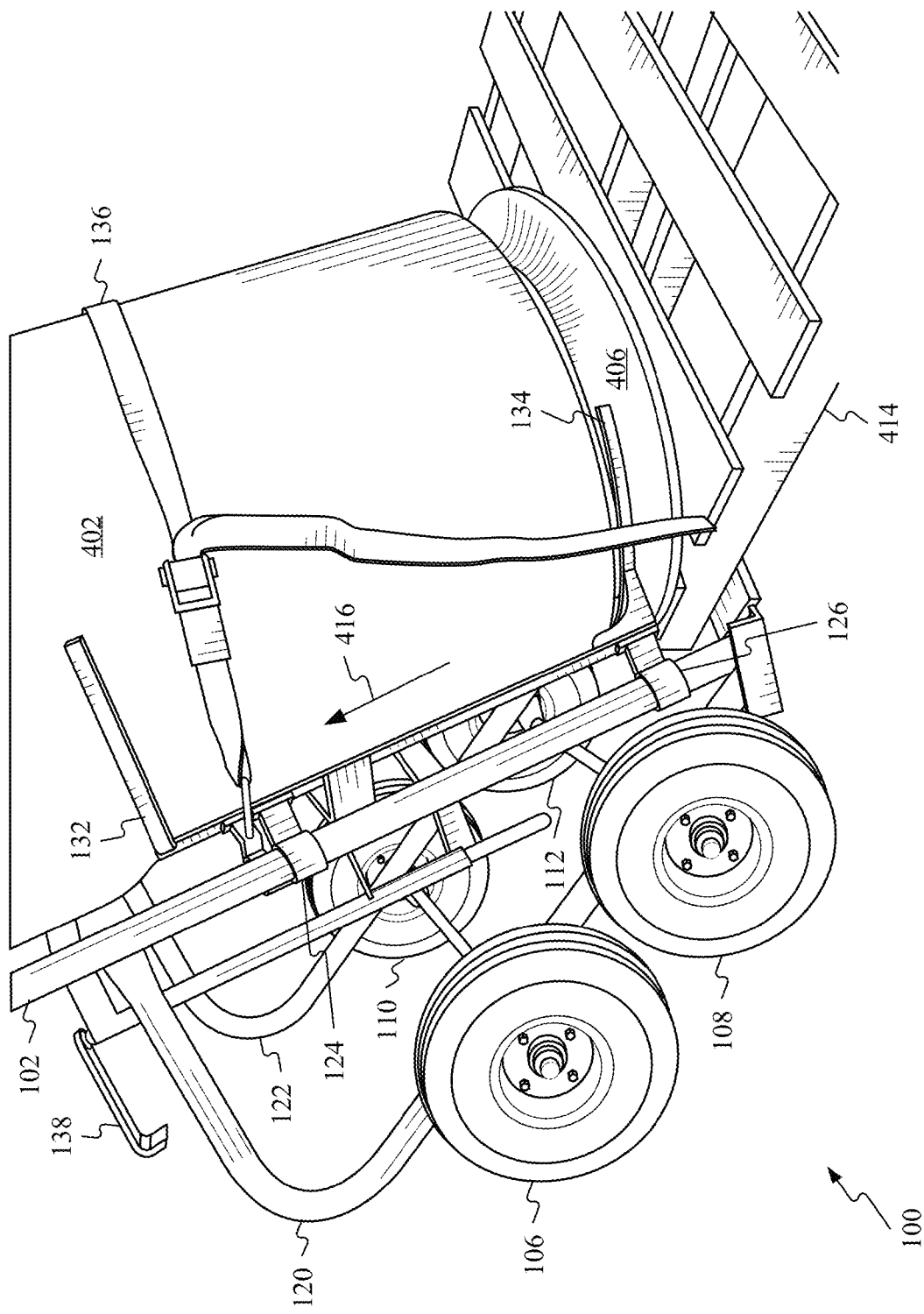

Once cart 100 approaches second pallet 414, FIG. 4I shows that cart 100 may be tilted forward to begin placing container 402 onto second pallet 414. During tilting of cart 100, receiving member 114 may traverse first support member 102 and second support member 104 as indicated by arrow 416 from the lower position. Receiving member 114's ability to traverse first support member 102 and second support member 104 may allow cart 100 to place container 402 elevated surfaces without having to lift cart 100 off the ground.

Figure 4J:
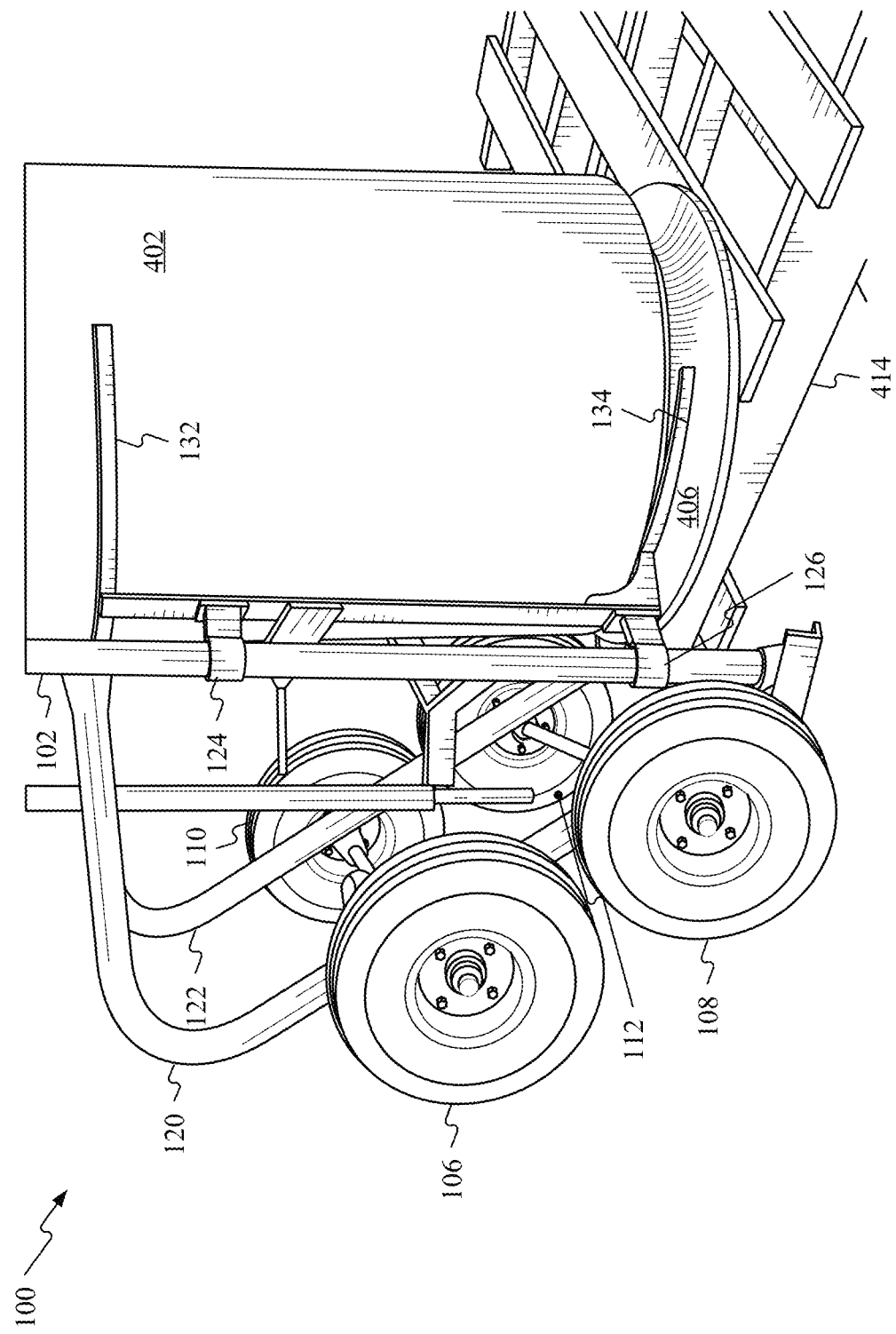

As shown in FIG. 4J, once cart 100 is tilted forward to place container 402 onto second pallet 414, container 402 may be securely placed on second pallet 414 and strap 136 may be removed. Receiving member 114's position may be at the upper position. The height of the upper position may be a function of the height of second pallet 414. In other words, if second pallet 414 were taller or shorter than shown in FIG. 4J, the upper position would be correspondingly different.

Figure 4K:
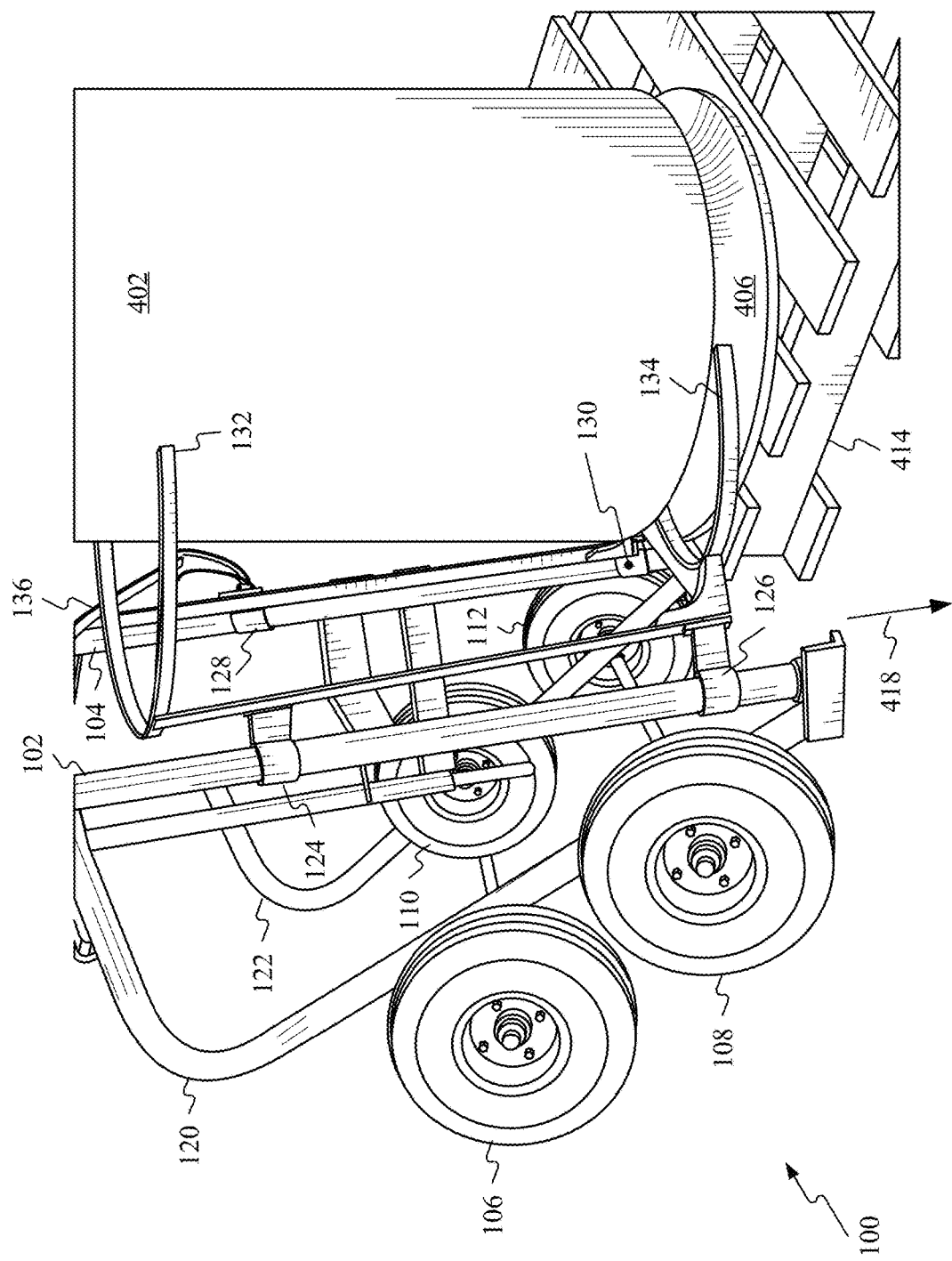

After container 402 is placed on second pallet 414 and strap 136 is removed, FIG. 4K shows that cart 100 may begin to be moved away from container 402. Cart 100 may be tilted back or may remain in a vertical position. As cart 100 is being moved away from container 402, receiving member 114 may begin to traverse first support member 102 and second support member 104 from the upper position downward as indicated by arrow 418.

Figure 4L:
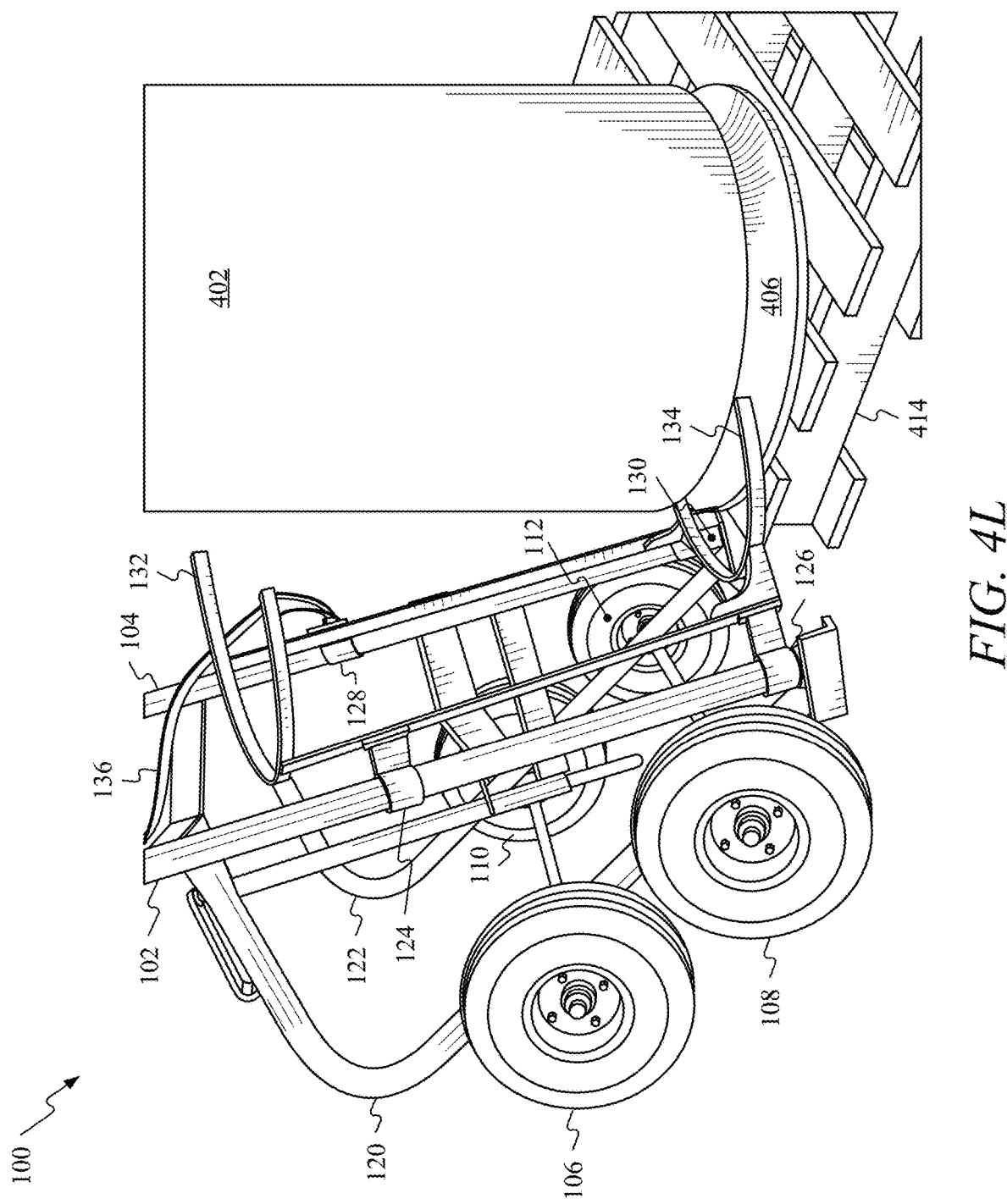

FIG. 4L shows that as cart 100 is initially moved away from container 402, cart 100 may be completely removed from container 402. As shown in FIGS. 4K and 4L, lower fork 134 may contact base 406 as receiving member 114 traverses first support member 102 and second support member 104 downward to rest in the lower position. FIG. 4M shows cart 100 may be moved away from container 402 after relocating container 402 from first pallet 404 to second pallet 414. As shown in FIG. 4M, receiving member 114 may be in the lower position.

While FIGS. 4A through 4M show cart 100 and receiving member 114 as one unit that receives container 402, embodiments may comprise receiving member 114 being permanently attached to container 402. In these embodiments, cart 100 and container 402 may be one unit. Still consistent with embodiments, receiving member 114 may be detachable from cart 100. For example, first sliding member 124, second sliding member 126, third sliding member 128, and fourth sliding member 130 may be configured to detach from first support member 102 and second support member 104. Receiving member 114 may be permanently attached to container 402 and cart 100 may be attached to receiving member 114. Receiving member 114 may be removable from both container 402 and cart 100 as well.

Figure 5:
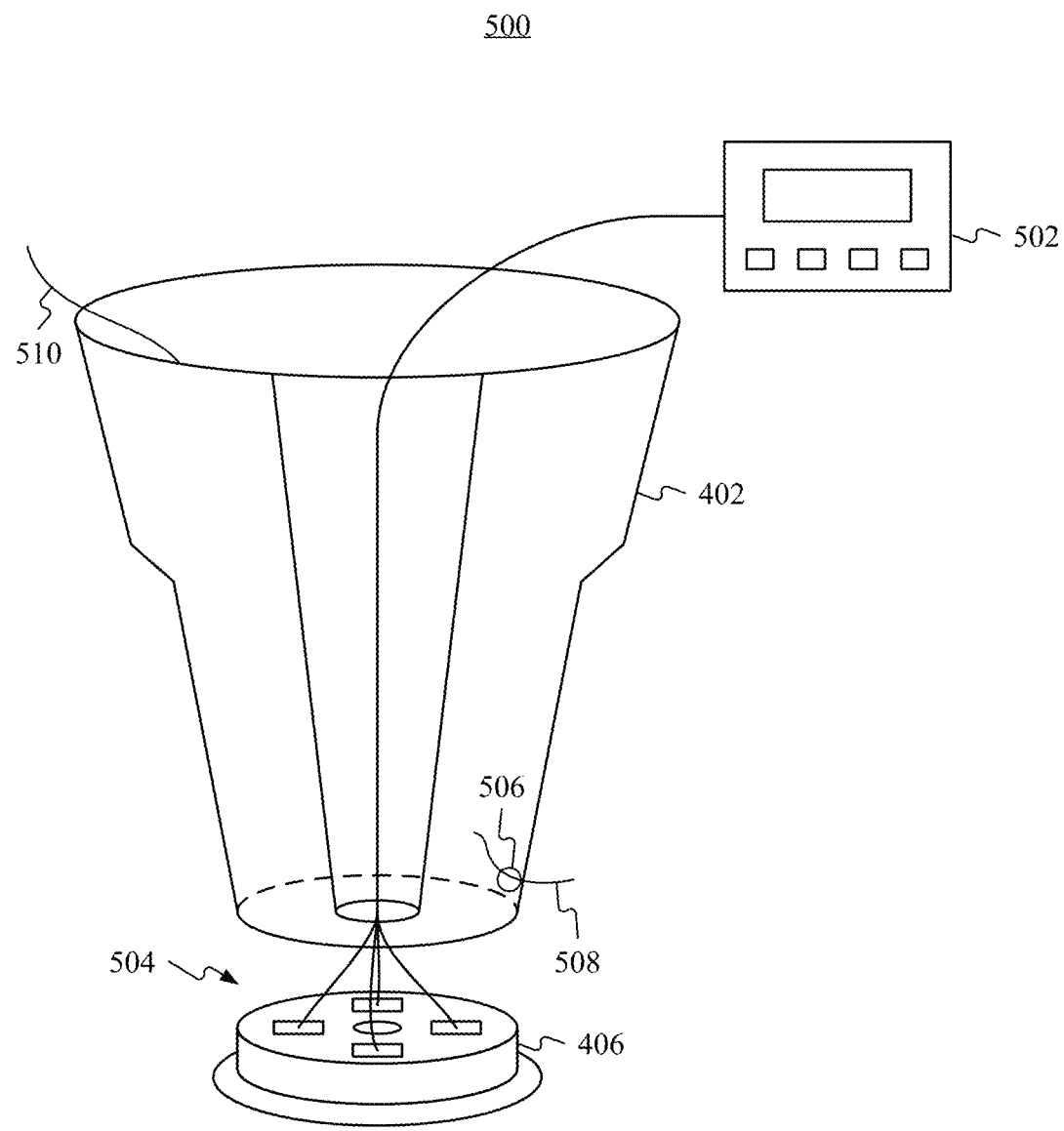
FIG. 5 shows a system that may be used to estimate an amount of wire in a container.

FIG. 5 shows a system 500 that may be used to estimate an amount of conductor located in container 402. System 500 may comprise container 402, base 406, an electronic display 502, and transducers 504. Transducers 504 may be, for example, piezoelectric sensors that may create a signal (e.g., a voltage) when a stress (i.e., the weight of wire in container 402) is applied to transducers 504. The signal may be transmitted to a computing device associated with electronic display 502.

Electronic display 502 may be connected to cart 100 or may be a standalone unit that may be connected to and removed from container 402 as needed. Transducers 504 may also be located on upper fork 132 and lower fork 134. When located on upper fork 132 or lower fork 134, transducers 504 may create a voltage in response to a stress applied to upper fork 132 and lower fork 134.

In addition, container 402 may comprise a hole 506. One end of the wire 508 located in container 402 may pass through hole 506. An electrician may use a multimeter to measure the total resistance between the one end of the wire 508 and another end of the wire 510. The total resistance may be inputted into electronic display 502 to calculate an amount of wire remaining in container 402.

Figure 6:
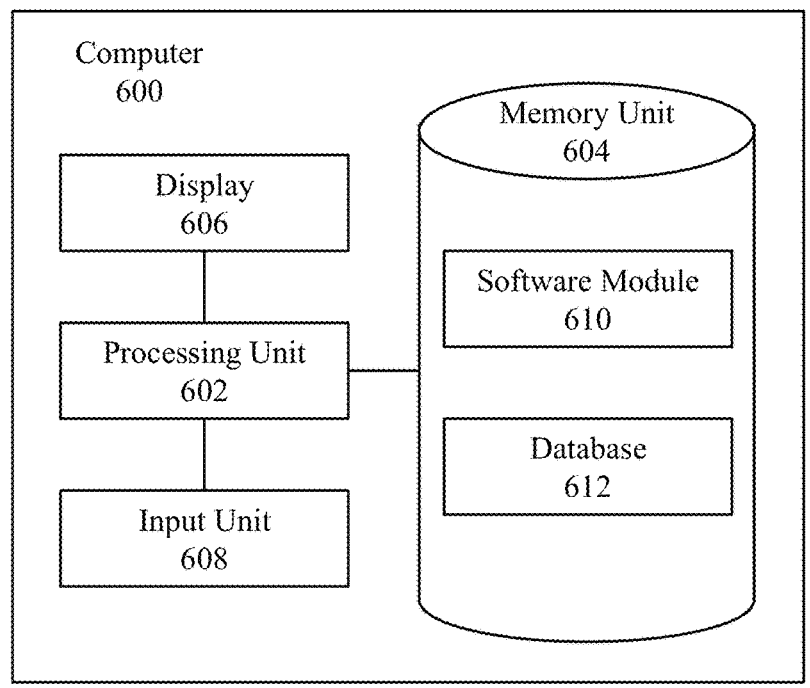
FIG. 6 shows a computer.

Electronic display 502 may include an application running on a computer 600 (e.g. the computing device), shown in FIG. 6, that may receive information from the transducers that allows computer 600 to calculate an amount of wire remaining in container 402. As shown in FIG. 6, computer 600 may include a processing unit 602, a memory unit 604, a display 606, and an input unit 608. Memory unit 604 may include a software module 610 and a database 612. While executing on processing unit 602, software module 610 may perform processes for determining an amount of conductor remaining in container 402, including, for example, one or more stages included in method 700 described below with respect to FIG. 7.

Computer 600 ("the processor") may be implemented using a personal computer, a network computer, a mainframe, a smartphone, or other similar computer-based system. Computer 600 may also be configured to transmit data to a supplier or manufacturer. For instance, if there is a problem with the wire in container 402 a user, using computer 600, may a scan barcode located on a label attached to container 402 and transit the information to the supplier of manufacturer of container 402.

The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, or a wireless fidelity (Wi-Fi) access point. The aforementioned systems and devices are examples and the processor may comprise other systems or devices.

Figure 7:
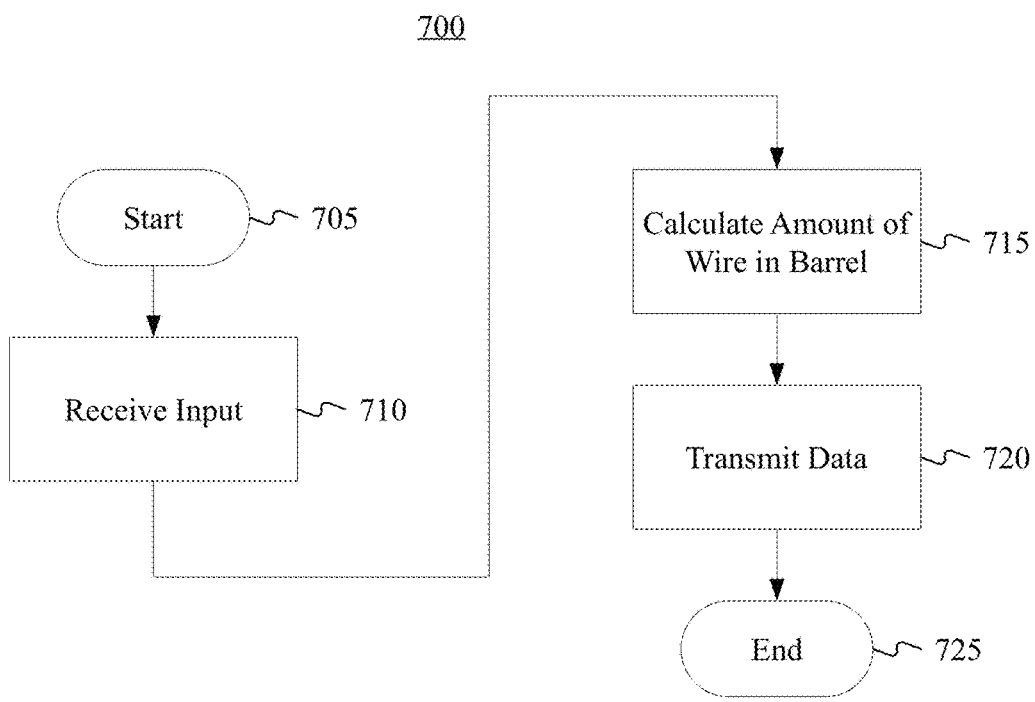
FIG. 7 shows a flow chart setting forth the general stages involved in a method for determining an amount of wire in a container.

FIG. 7 is a flow chart setting forth the general stages involved in method 700 for determining an amount of conductor remaining in container 402. Method 700 may be implemented using, for example, computer 600 as described in more detail above. Ways to implement the stages of method 700 will be described in greater detail below.

Method 700 may begin at starting block 705 and proceed to stage 710 where computer 600 may receive input including information. For example, after using some of the conductor in container 402, an electrician may input the information about container 402 and/or the conductor in container 402 into computer 600 via electronic display 502. For instance, the electrician may input the information such as wire size, container size, sheathing/insulation material, type of metal wire is made of, sheathing/insulation thickness, etc. Moreover, the weight of container 402 may be obtained from the signal supplied by transducers 504. The total resistance of the wire may be inputted as well.

Some or all of the information may be received by computer 600 by reading a barcode on a label attached to container 402. Consistent with embodiments of the invention, the label may be attached to container 402. The label may include the bar code. The barcode may include information about container 402 and the contents of container 402. The electrician may cause computer 600 to read the barcode to gather the information needed to calculate the amount of conductor remaining in container 402. For example, the electrician may cause computer 600 to read the barcode. Computer 600 may use data read from the barcode to lookup needed information from database 612 to calculate the remaining amount of conductor in container 402. Furthermore, computer 600 may use data read from the barcode to query a database over the internet for the needed information. Computer 600 may retrieve information such as, weight per unit length of the conductor in container 402, wire gauge of the conductor, alloy used to construct the conductor and associated properties (e.g., density) of the alloy, and number of wire strands of the conductor. In short, information needed to calculate the remaining conductor in container 402 may be received by computer 600 from transducers 504, via the electrician's inputs into electronic display 502 and/or using the barcode.

From stage 710, where computer 600 received the input, method 700 may advance to stage 715 where computer 600 may calculate the amount (e.g. length) of conductor remaining in container 402. For example, computer 600 may use a formula stored in memory unit 604 to calculate the remaining amount of conductor. The formula may comprise a first component corresponding to the unit length per weight (e.g. ft. per lbs.) for the conductor and a second component corresponding to the weight (e.g. lbs.) of the conductor remaining in the container. These two components may be multiplied to provide the remaining length of conductor in container 402. The first component may be derived from the bar code and/or from data inputted by the electrician into the electronic display 502. The second component may be derived from transducers 504 that may supply the weight of the conductor in container 402 and the weight of container 402 itself. To obtain the second component, the weight of container 402 itself may be subtracted from the weight of the conductor and container 402 supplied by transducers 504.

In stage 715, computer 600 may use the total resistance and the information about the conductor to determine an amount of conductor remaining in container 402. For example, the total resistance may be used in conjunction with the conductor's resistance per foot data to calculate an estimate of an amount of wire located in container 402.

From stage 715, where computer 600 calculates the remaining amount of conductor in container 402, method 700 may advance to stage 720 where electronic display 502 may display the remaining amount of conductor in container 402. In addition, computer 600 may transmit the remaining amount of conductor in container 402 to a supplier, manufacturer, or other entity. For example, computer 600 may transmit the remaining amount of conductor to a supplier notifying the supplier that the electrician may need more conductor. In addition, if there is some defect with container 402 or the conductor located therein, the supplier or manufacturer may be notified and the electrician given a credit, discount, or other monetary compensation. From stage 720, where computer 600 may transmit data, method 700 may end at stage 725.

Figure 8:
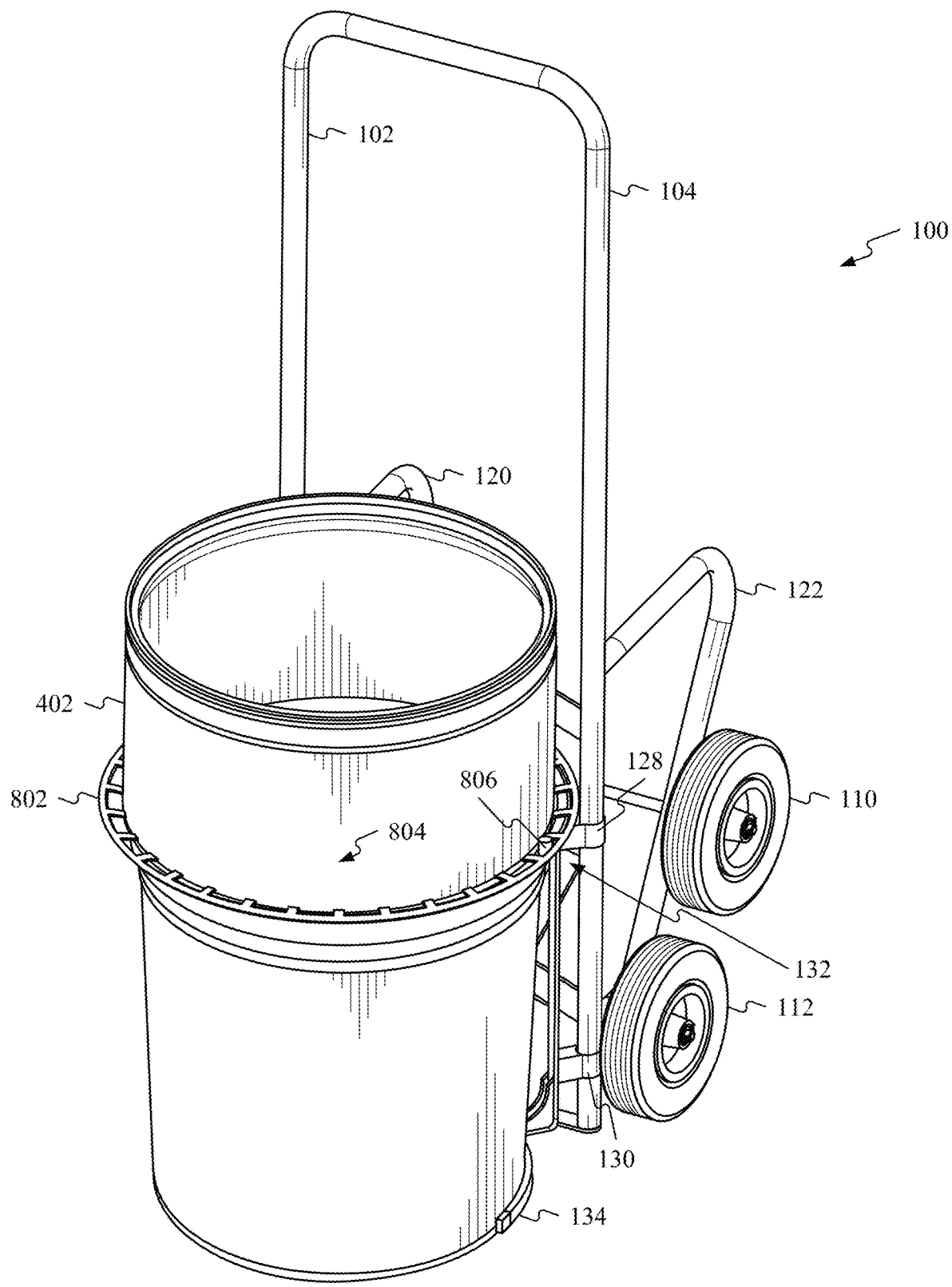
FIG. 8 shows a container and cart combination.

FIG. 8 shows container 402 connected to cart 100. Consistent with embodiments, a ring 802 may encircle container 402. Ring 802 may comprise a plurality of holes 804 and may be positioned proximate to the top of container 402. A post 806 may extend from upper fork 132. Post 806 may fit with plurality of holes 804 and may secure container 402 to cart 100. For example, post 806 protrude upwards from upper fork 132 and through one of the plurality of holes 804 to mechanically link ring 802 and container 402 to upper fork 132 and cart 100.

While FIG. 8 shows ring 802 arranged to engage upper fork 132, ring 802 may be positioned to engage lower fork 134. In addition, multiple rings may be used and both lower fork 134 and upper fork 132 may engage separate rings. For instance, a second ring comprising a second plurality of holes may be positioned proximate the bottom of container 402 and lower fork 134 may have a second post that may fit one of the second plurality of holes. Furthermore, ring 802's vertical position along container 402 may be adjustable or fixed. For example, ring 802 may be welded or glued to container 402 to maintain a fixed position. For ring 802 to be adjustable, a plurality of screws or bolts may be used to fasten ring 802 to container 402. To adjust ring 802's position, the screws or bolts may be removed, ring 802's position changed, and screws or bolts reinserted to secure ring 802 in a new position. Moreover, the screws or bolts may be removed and ring 802 may be removable from container 402.

Figure 9:
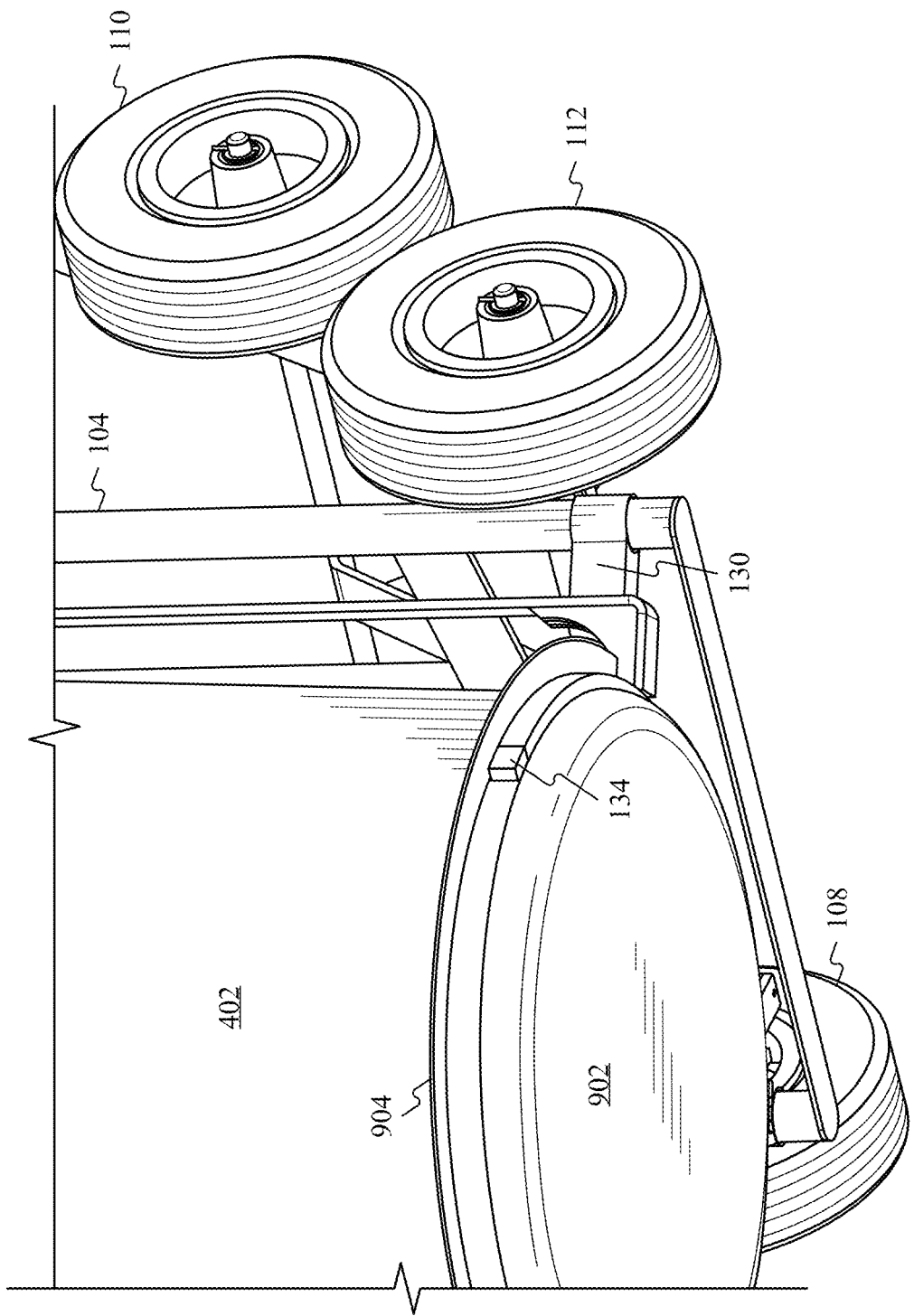
FIG. 9 shows a container with a cap.

FIG. 9 shows container 402 connected to a cap 902. Cap 902 may be permanently attached to container 402 or removable from container 402. Attaching and removing cap 902 may be accomplished with or without tools. During operation, lower fork 134 may interact with a lip 904 and may cause receiving member 114 to traverse (e.g. slide), as described above with respect to FIGS. 4A-4M.

FIGS. 10A and 10B show a cart 1000. Cart 1000 may comprise a support member 1002, a plurality of wheels (e.g., a first wheel 1004 and a second wheel 1006), and a free floating receiving member 1008. The plurality of wheels may be connected directly to support member 1002 or may be connected to an angled connecting member 1010.

Free floating receiving member 1008 may be connected to support member 1002 by a first linkage 1012 and a second linkage 1014. While FIGS. 10A and 10B show two linkages, any number of linkages may be utilized to connect free floating receiving member 1008 to support member 1002. The linkages may include, for example, bearings, grease plugs, and other friction reducing elements to facilitate free floating receiving member 1008's movement. In addition, free floating receiving member 1008 may be detachable from support member 1002.

Free floating receiving member 1008 may include an upper fork 1016 and a lower fork 1018. Upper fork 1016 and lower fork 1018 may be contoured to match a profile of a container such as, for example, a container containing multiple unbound conductors. In addition, upper fork 1016 and lower fork 1018 may comprise tines that may extend and lock into place to better secure the container to cart 1000. In addition, a strap (not shown) may be used to better secure the container to cart 1000. A wire guide (shown in FIG. 3) may be attached to cart 1000 and may be attached to support member 1002 and operate as described above with respect to FIGS. 1-3.

First linkage 1012 and second linkage 1014 may allow free floating receiving member 1008 to change position as described above with respect to FIGS. 4A-4M. The movement of free floating receiving member 1008 may allow cart 1000 to be used to transport containers from a first surface 1020 (e.g. a floor) to an elevated surface 1022 (e.g., a pallet).

Figure 11A:
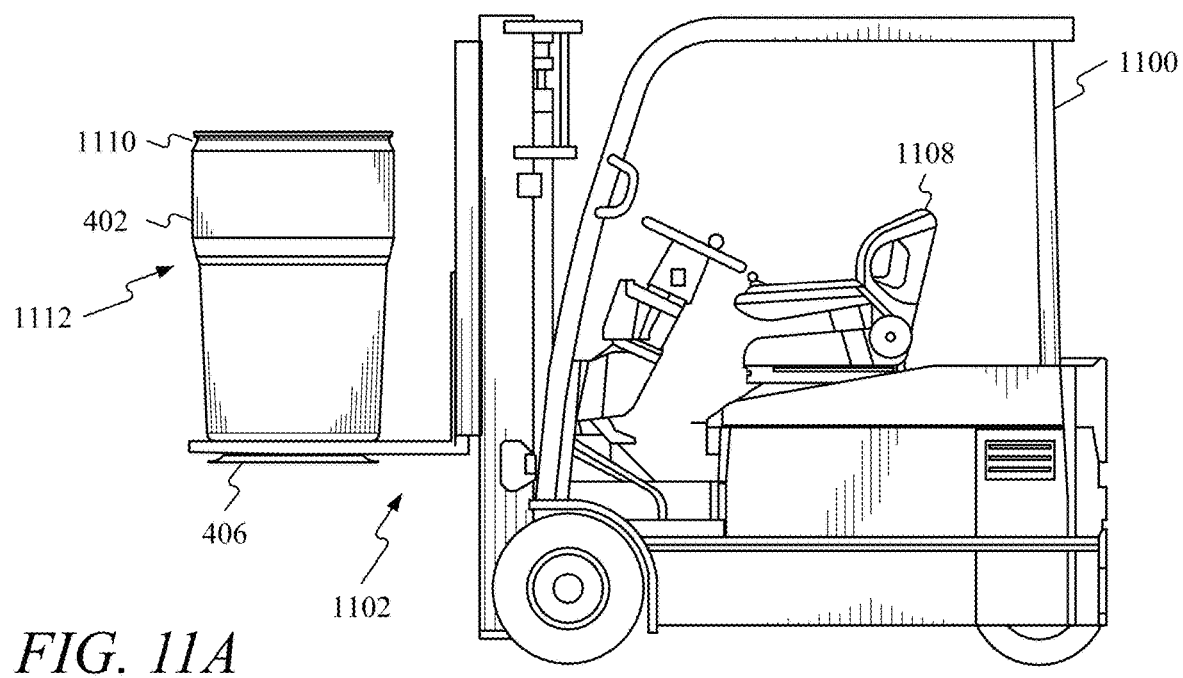
FIGS. 11A, 11B, and 11C show a forklift and a container.
Figure 11B:
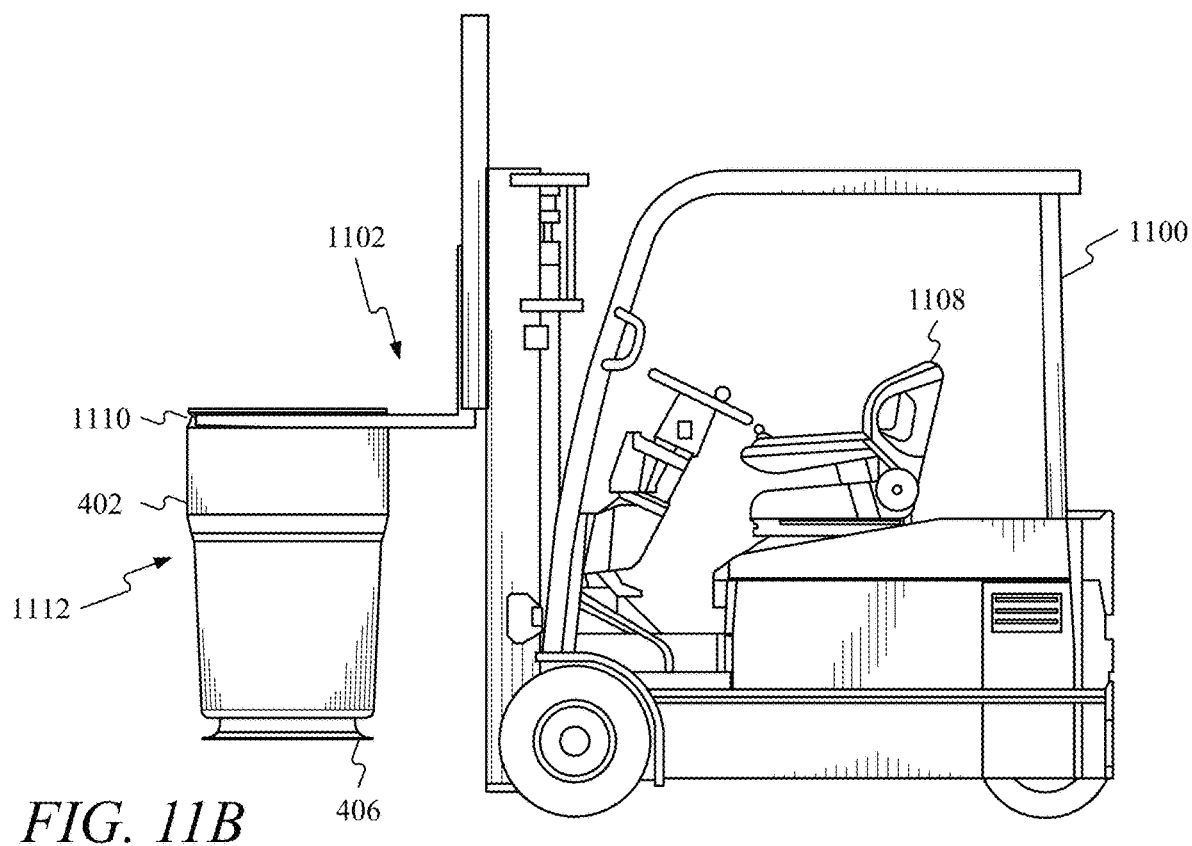
Figure 11C:
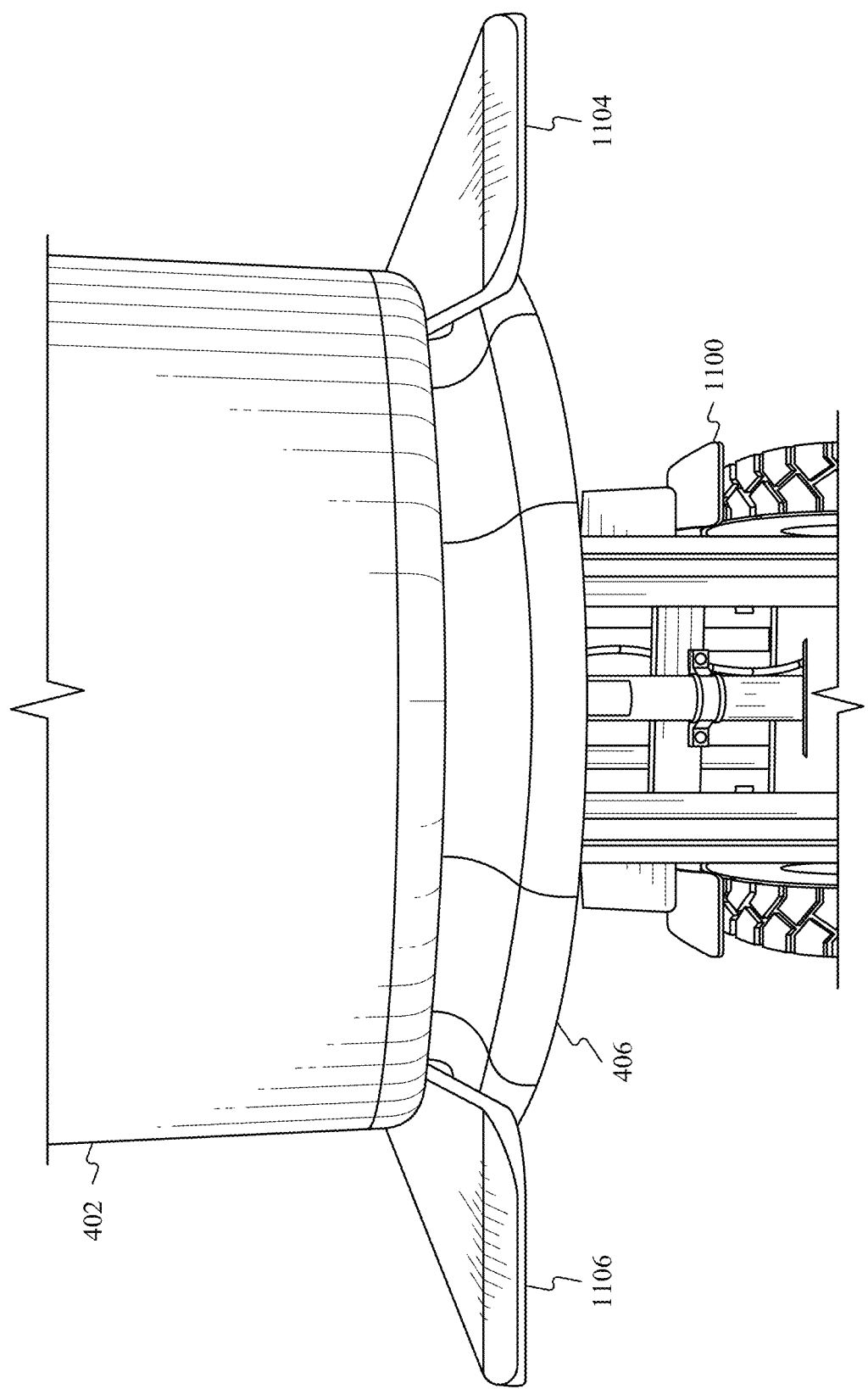

FIGS. 11A, 11B, and 11C show a forklift 1100. Forklift 1100 may comprise a pair of forks 1102 (i.e., a left fork 1104 and a right fork 1106, as viewed from a driver's seat 1108). As shown in FIGS. 11A and 11C, during operation, pair of forks 1102 may fit between container 402 and base 406. As pair of forks 1102 are raised or lowered, container 402 may be raised or lowered. In addition, pair of forks 1102 may grip container 402 via a groove 1110. Groove 1110 may be molded into container 402 when container 402 is constructed. In addition, external fixtures may be attached to container 402 to provide a surface for pair of forks 1102 to engage. In addition, pair of forks 1102 may grip container 402 at a middle section 1112 of container 402.

Figure 12A:
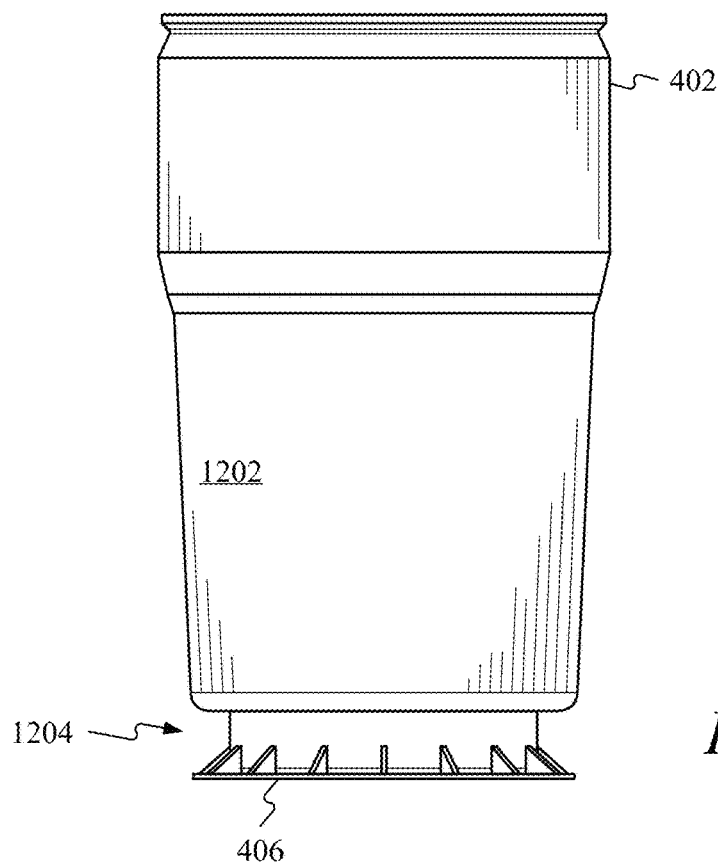
FIGS. 12A and 12 B show a container.
Figure 12B:
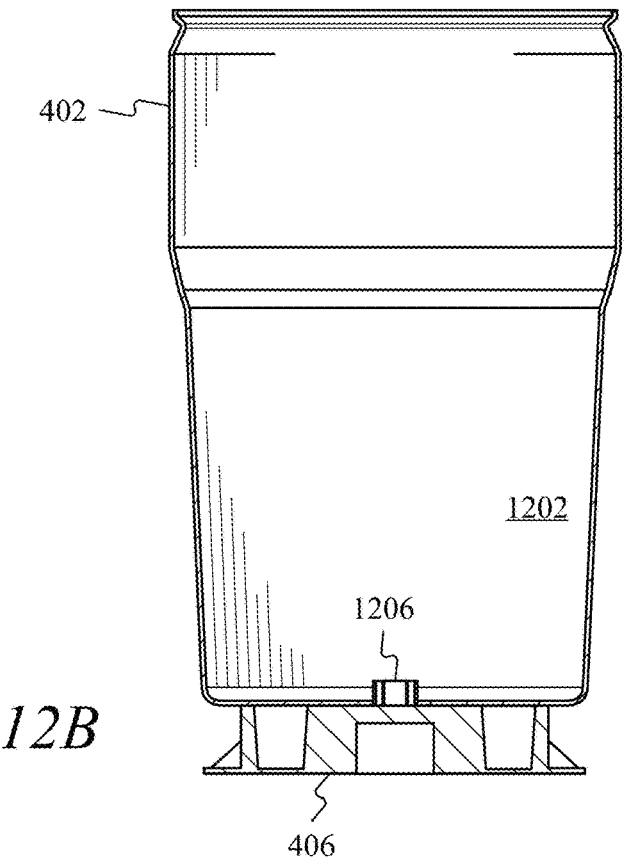

FIGS. 12A and 12B show a container 402. Container 402 may comprise container 402 and base 406. Container 402 may define a volume 1202 that may house a length of conductors. Base 406 may be connected to container 402 and may define an indentation 1204 along a perimeter where base 406 and container 402 meet. Indentation 1204 may have a distinctive cross section. For example, lower fork 134 may have the distinctive cross section such as, for example, a hexagon shape. Indentation 1204 may have a complimentary distinctive cross section such as, for example, a hexagon shape that may receive lower fork 134. Indentation 1204 may comprise any shape. For instance, indentation 1204 may be circular, triangular, square, pentagonal, hexagonal, heptagonal, octagonal, etc.

Base 406 may be configured to be connected and disconnected from container 402. Connecting and disconnecting base 406 to and from container 402 may be accomplished with or without tools. For example, base 406 may have a threaded portion that may mate with a complementary threaded portion located on container 402. For instance, base 406 may comprise a male threaded portion 1206 that may mate with a female threaded portion located on container 402. Connecting and disconnecting base 406 to and from container 402 without tools may comprise the threaded portions of container 402 and base 406 being able to be screwed together without need wrenches or other tools. Other examples of connecting and disconnecting base 406 to and from container 402 may include having mortises and tenons that may engage one another and can be manipulated without using tools (i.e., by hand). Without tools may mean that a user may be able to connect base 406 to container 402 using only his or her hands and not needing any tools or other special equipment.

Figure 13:
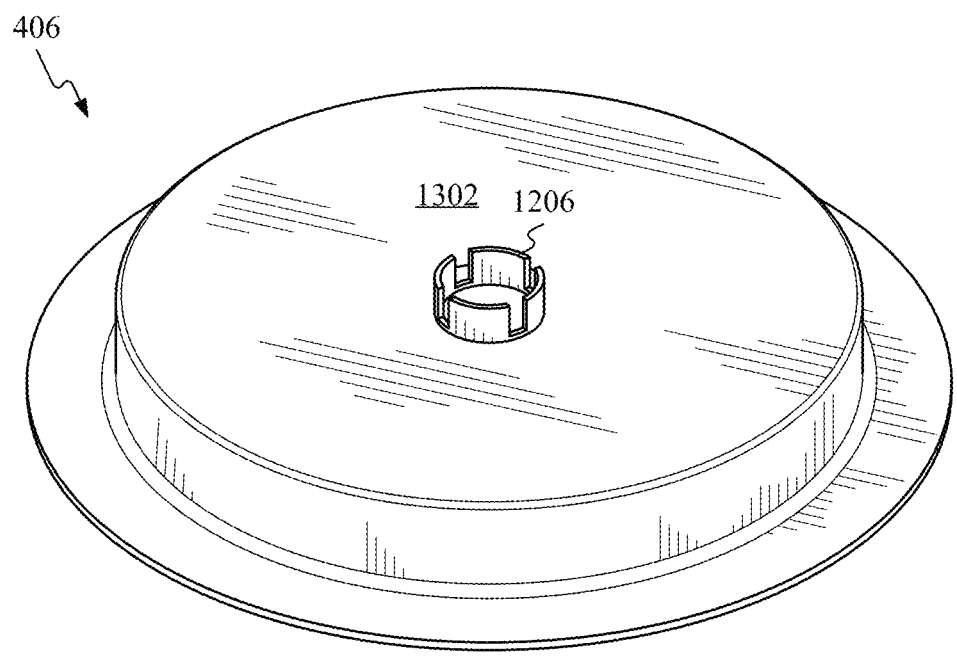
FIG. 13 shows a base.

FIG. 13 shows base 406. As discussed above, base 406 may comprise threaded portion 1206. Threaded portion 1206 may be located on a top surface 1302. While FIGS. 4A through 4M show lower fork 134 engaging a curved surface, as shown in FIG. 13, base 406 may comprise a non-curved surface.

Figure 14:
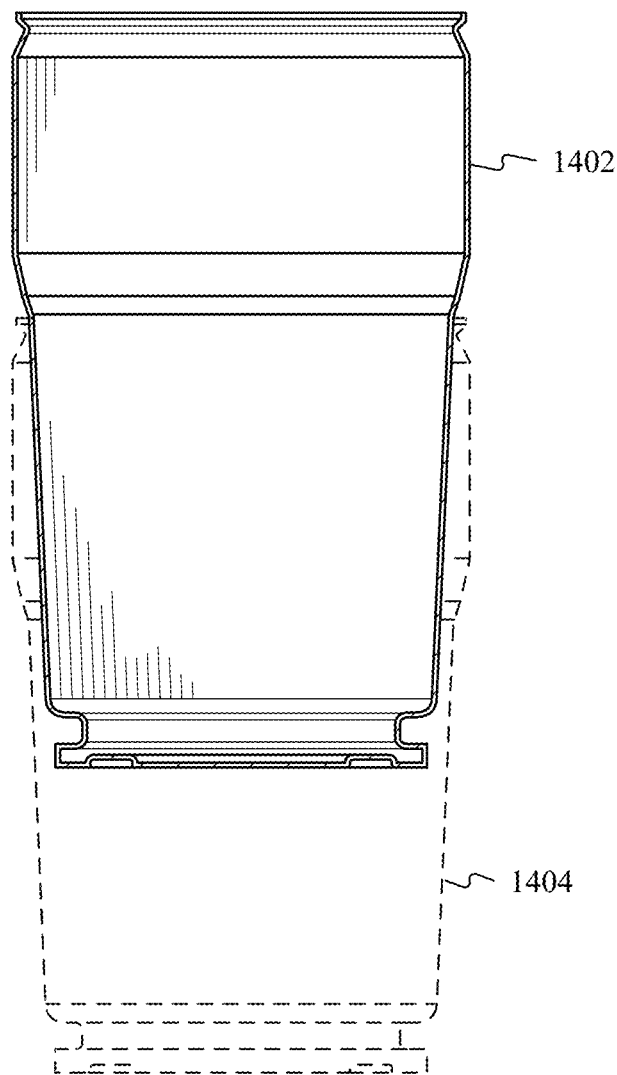
FIG. 14 shows stacked containers.

As shown in FIG. 14, multiple containers may be stacked. For example, a first container 1402 may be inserted into a second container 1404. First container 1402 and second container 1404 may each comprise a base as described above. First container 1402 and second container 1404 may be stacked by removing the base from second container 1404. The removed base may be stored in first container 1402 during transport or storage.

Figure 15:
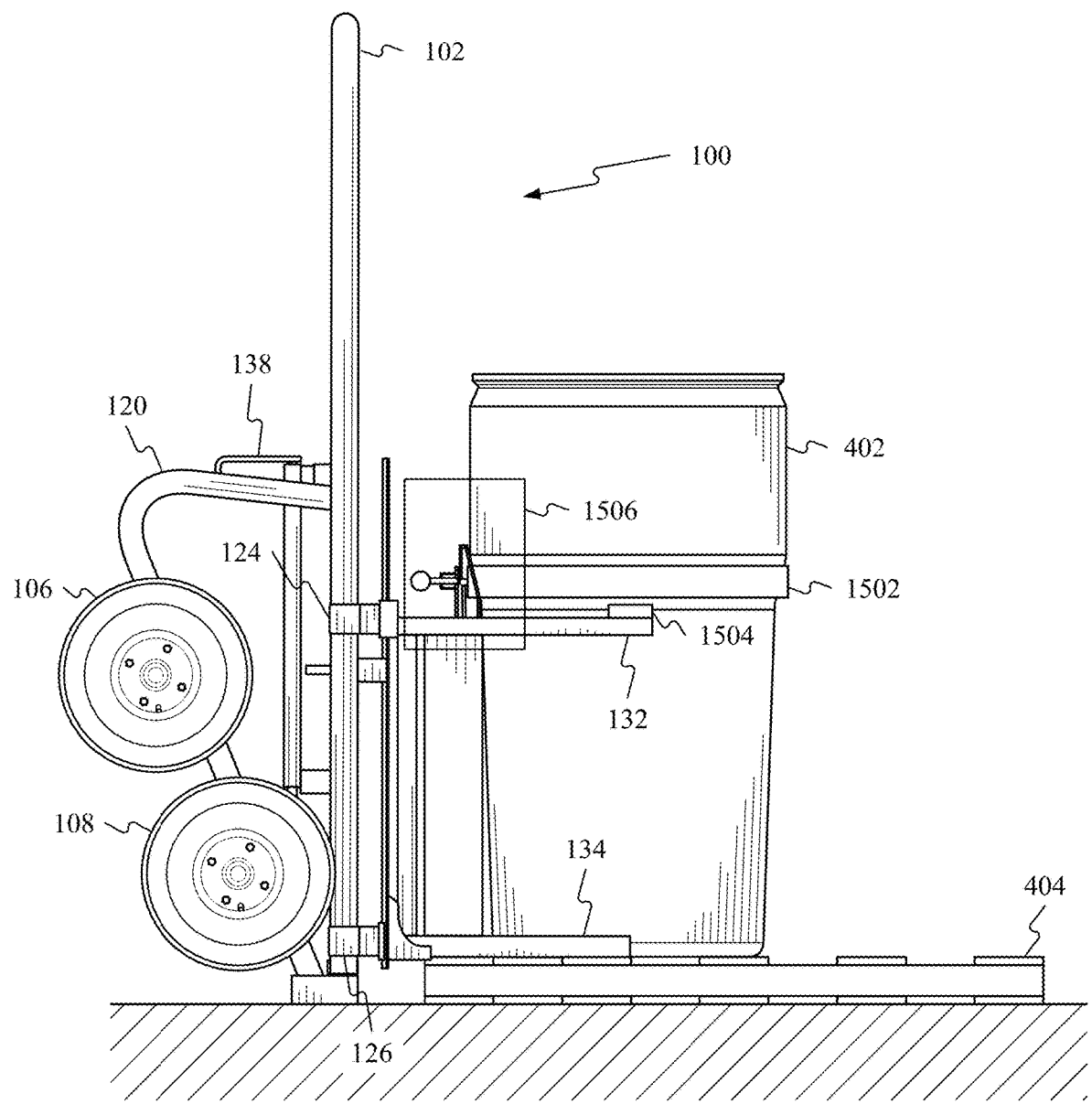
FIG. 15 shows a container and cart combination.

FIG. 15 shows container 402 connected to cart 100. Consistent with embodiments, a handling ring 1502 may encircle container 402. A fork projection 1504 may extend from upper fork 132. Projection 1504 may fit with handling ring 1502 and may assist in securing container 402 to cart 100. For example, fork projection 1504 may protrude upwards from upper fork 132 and into a cavity (shown in FIGS. 17 and 18) to mechanically link fork projection 1504 and container 402 to upper fork 132 and cart 100. While FIG. 15 shows handling ring 1502 arranged to fit upper fork 132, the handling ring may be positioned to fit lower fork 134. In addition, multiple handling rings may be used and both lower fork 134 and upper fork 132 may fit separate handling rings.

Figure 16:
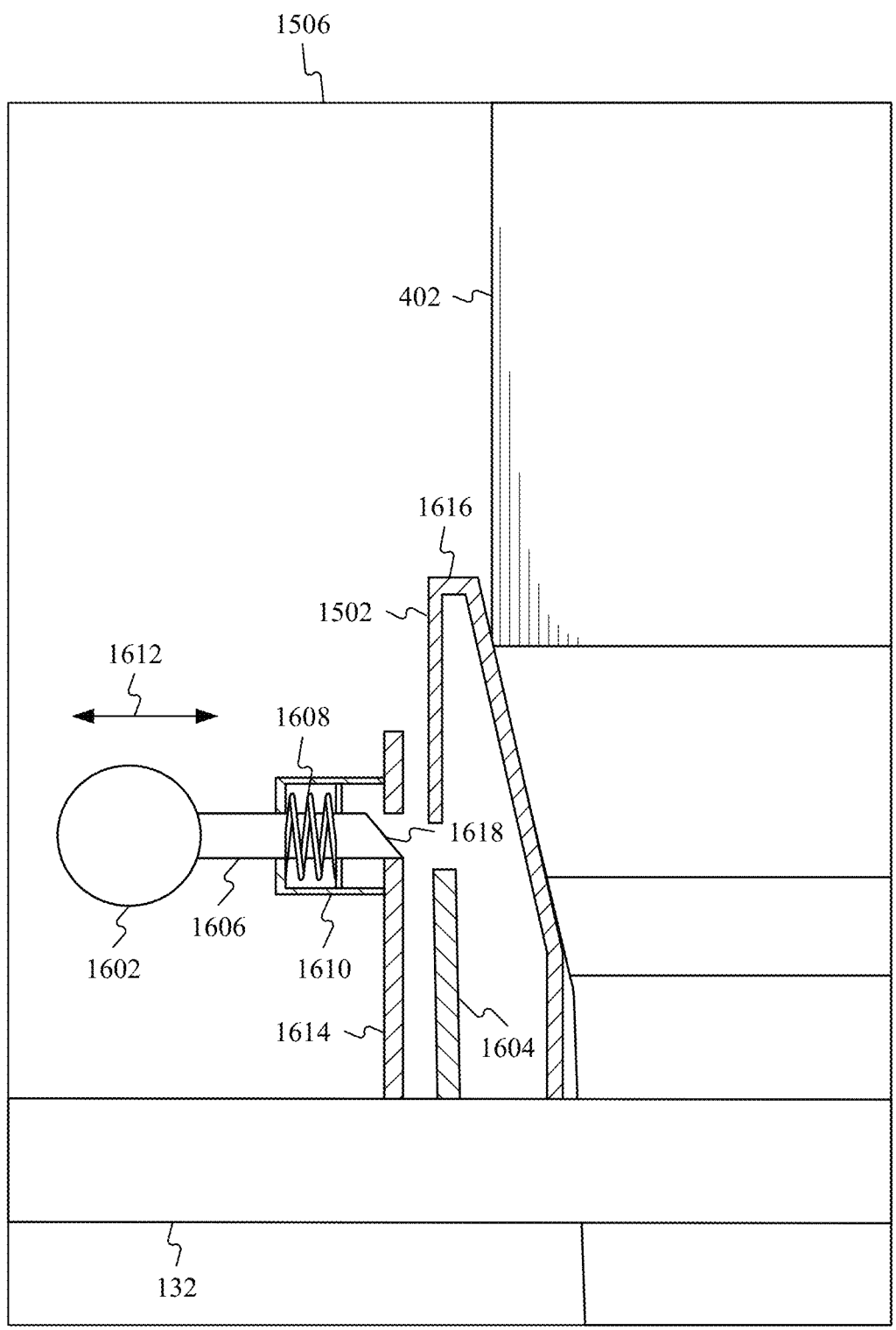
FIG. 16 shows a locking mechanism.

In addition, a locking mechanism 1506 may be used to secure container 402 to cart 100. FIG. 16 shows locking mechanism 1506. Locking mechanism 1506 may comprise a handle 1602 and a locking tooth 1604. Handle 1602 may comprise a shaft 1606, a spring 1608, and housing 1610. Shaft 1606 may pass though spring 1608 and housing 1610. Housing 1610 may contain spring 1608.

During use, handle 1602 and shaft 1606 may slide though housing 1610 as indicated by arrow 1612. A portion of handling ring 1502 may slide between a rear plate 1614 and locking tooth 1604 and may rest on locking tooth 1604. Once handling ring 1502 is resting on locking tooth 1604, shaft 1606 may travel toward container 402 and over a top 1616 of handling ring 1502 to secure container 402 to cart 100. Shaft 1606 may comprise a beveled surface 1618. Handling ring 1502 may contact beveled surface 1618 and cause shaft 1606 to clear handling ring 1502. To remove container 402, the user may pull handle 1602 so that shaft 1606 clears top 1616. Container 402 may be engaged by upper fork 132 without using locking mechanism 1506.

Figure 17A:
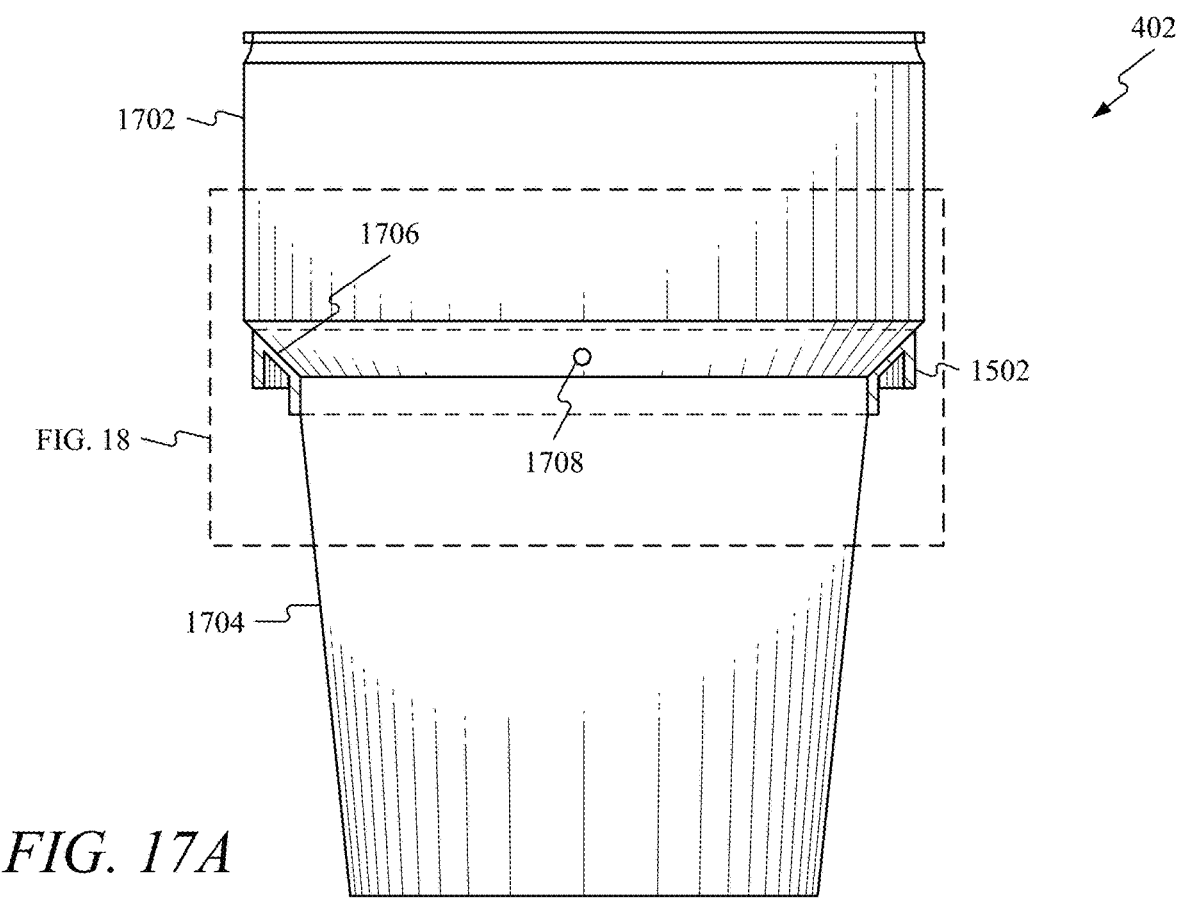
FIGS. 17A and 17B show a container.
Figure 18:
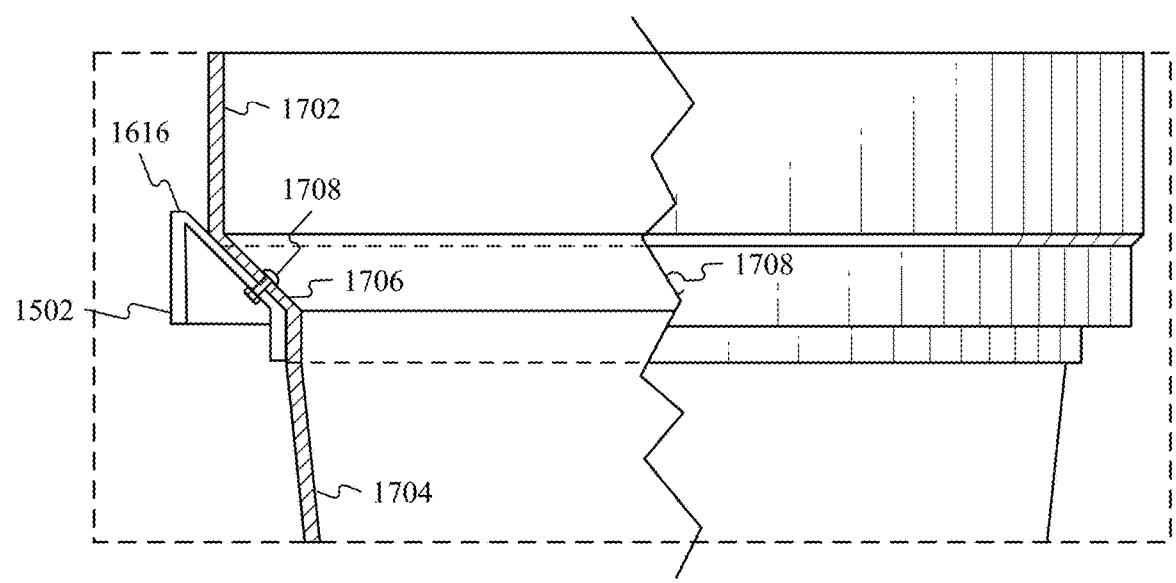
FIG. 18 shows a container and a handling ring.
Figure 17B:
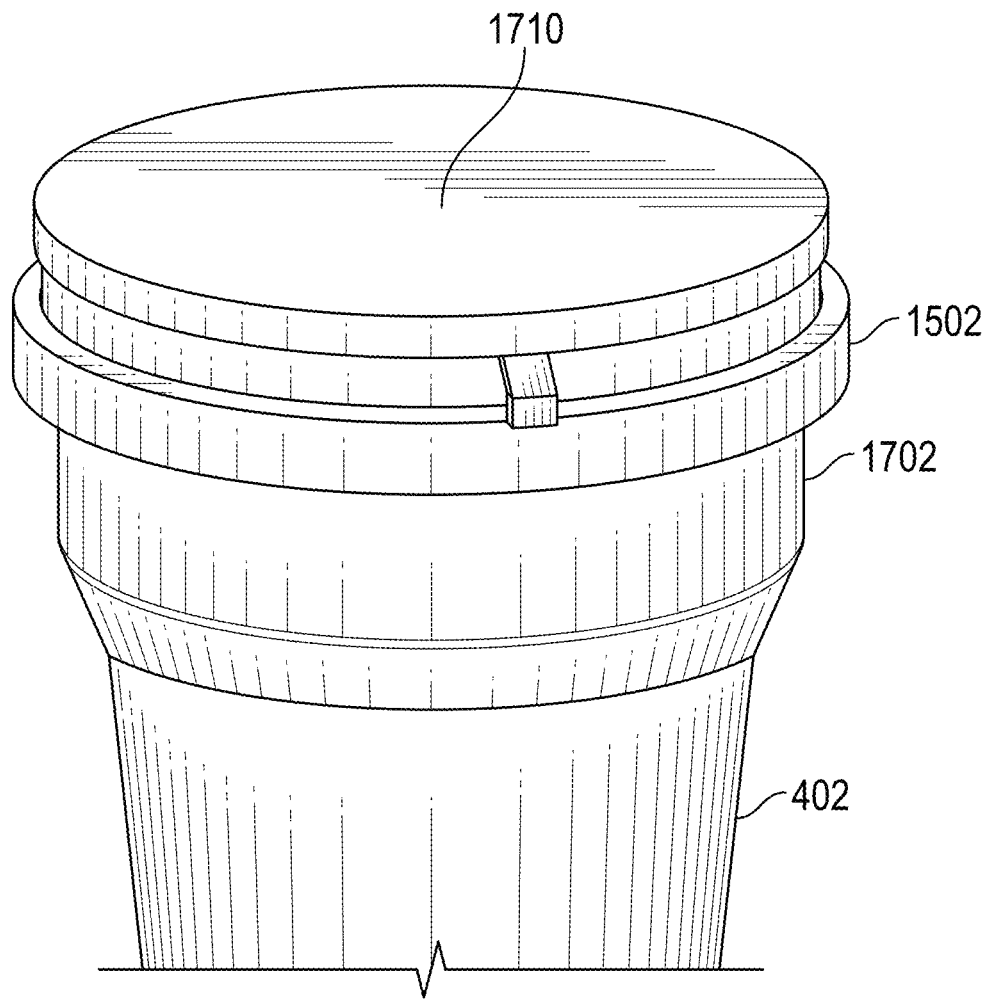

FIGS. 17A and 17B show container 402 with handling ring 1502. Container 402 may comprise an upper portion 1702 and a lower portion 1704. Handling ring 1502 may rest against an angled portion 1706. FIG. 18 shows that handling ring 1502 may be secured to container 402 with one or more connectors 1708. Examples of connectors 1708 may include, but are not limited to, rivets, bolts, screws, staples, and adhesives.

In addition, depending on the materials used to construct container 402 and handling ring 1502, the two may be welded together. For example, if container 402 and handling ring 1502 are plastic, ultrasonic welding techniques may be used to fuse handling ring 1502 to container 402. FIG. 17A shows handling ring 1502 attached to container 402 proximate a middle portion of container 402. FIG. 17B shows that handling ring 1502 may be attached to container 402 at upper portion 1702 proximate a lid 1710.

Figure 19:
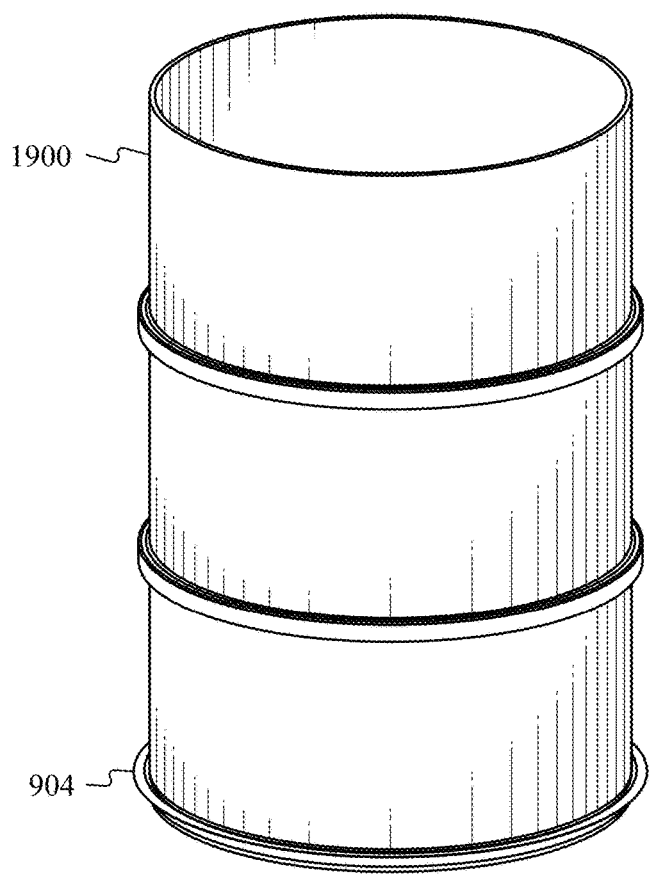
FIG. 19 shows a drum with a cap.

FIG. 19 shows a drum 1900 connected to cap 902. Cap 902 may be permanently attached to drum 1900 or removable from drum 1900. Attaching and removing drum 1900 may be accomplished with or without tools. During operations, lower fork 134 may interact with lip 904 and may cause receiving member 114 to traverse (e.g. slide), as described above with respect to FIGS. 4A-4M.

Figure 20:
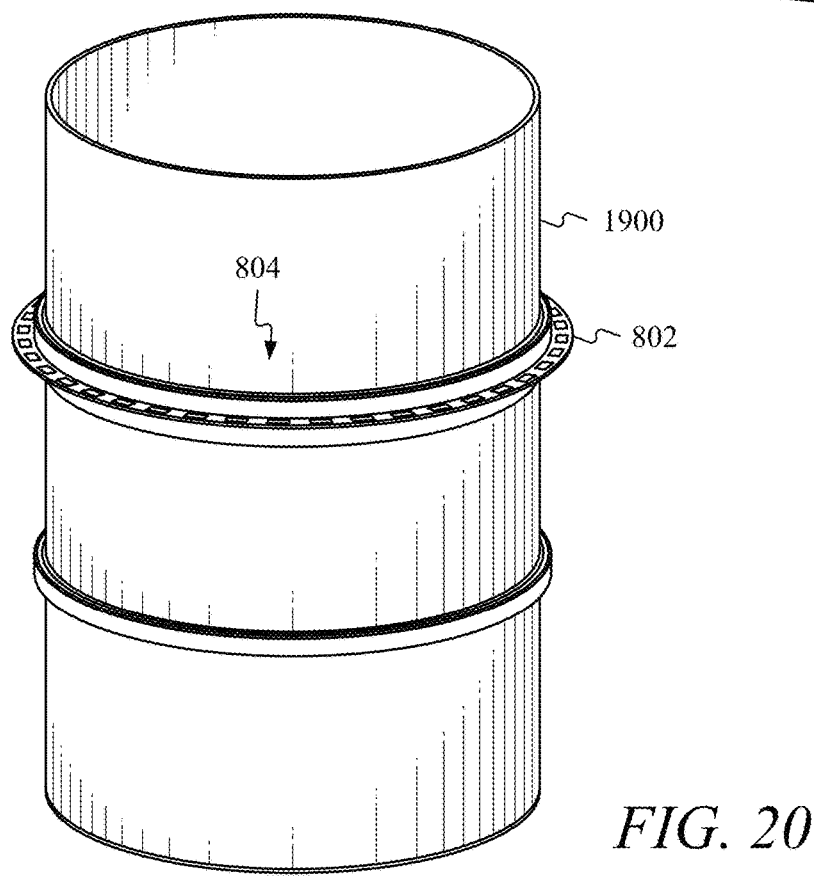
FIG. 20 shows a drum with a ring.

FIG. 20 shows drum 1900 and ring 802. Ring 802 may encircle drum 1900. Ring 802 may comprise a plurality of holes 804. Post 806 (shown in FIG. 8) may extend from upper fork 132. Post 806 may fit with plurality of holes 804 and may secure drum 1900 to cart 100. For example, post 806 may protrude upwards from upper fork 132 and through one of the plurality of holes 804 to mechanically link ring 802 and drum 1900 to upper fork 132 and cart 100.

While FIG. 20 shows ring 802 arranged near an upper third of drum 1900, ring 802 may be located near a lower third or in any position along drum 1900. In addition, one or more rings may be used and both lower fork 134 and upper fork 132 may fit separate rings. For instance, a second ring comprising a second plurality of holes may be positioned proximate the bottom of drum 1900 and lower fork 134 may have a second post that may fit one of the second plurality of holes. Furthermore, ring 802's vertical position along drum 1900 may be adjustable or fixed. For example, ring 802 may be welded or glued to drum 1900 to maintain a fixed position. For ring 802 to be adjustable, a plurality of screws or bolts may be used to fasten ring 802 to drum 1900. To adjust ring 802's position, the screws or bolts may be removed, ring 802's position changed, and screws or bolts reinserted to secure ring 802 in a new position. Moreover, the screws or bolts may be removed and ring 802 may be removable from drum 1900.

Figure 21:
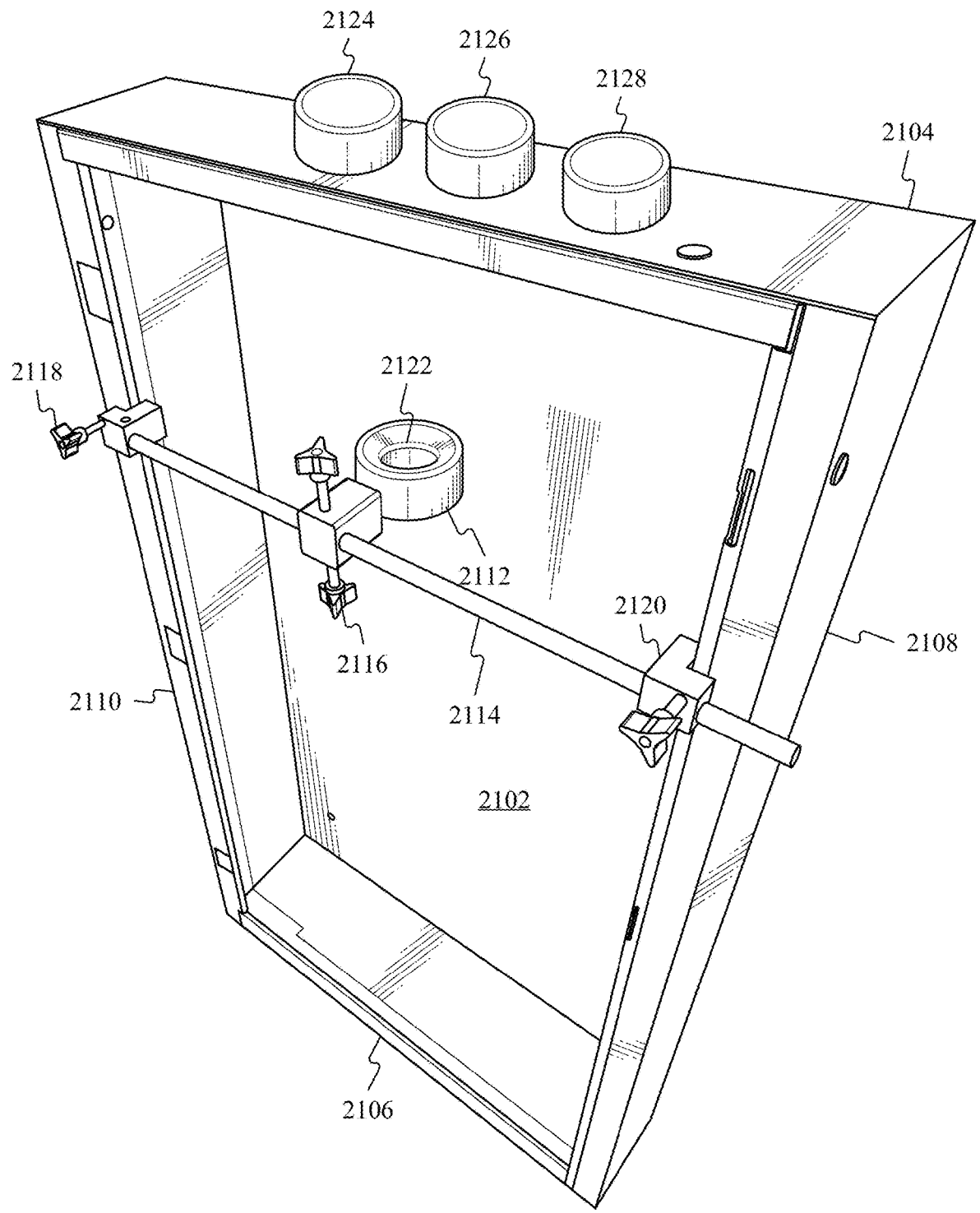
FIG. 21 shows a panel.

FIG. 21 shows a panel 2100. Panel 2100 may comprise a back 2102, a top 2104, a bottom 2106, a first side 2108, and a second side 2110. A wire guide 2112 may be temporarily attached to panel 2100. Wire guide 2112 may be attached to and moveable along a horizontal support 2114 via first clamp 2116. Horizontal support 2114 may be attached to panel 2100 with a second clamp 2118 and a third clamp 2120.

During use, an electrician may pull wires from container 402 through a hole 2122 located in wire guide 2112. Panel 2100 may be connected to a first conduit 2124, a second conduit 2126, and a third conduit 2128. To assist in pulling the wires through respective conduits (e.g. first conduit 2124, second conduit 2126, and third conduit 2128), wire guide 2112 may be repositioned along horizontal support 2114 to line up underneath a respective one of the respective conduits. For example, to assist in pulling the wires through first conduit 2124, wire guide 2112 may be positioned underneath first conduit 2124.

Wire guide 2112 may comprise a shaped surface that may provide conductors a smooth transition away from wire guide 2112 as it passes through wire guide 2112. The shaped surface may be curved, arc-shaped, parabolic, or any other shape that may provide a smooth transition. The shaped surface may allow conductors to be pulled from container 402 without damage to the conductors. In addition, the shaped surfaces may allow the conductors to be pulled in any direction without damage.

Wire guide 2112 may act to hinder the conductors from falling back into container 402 when not being pulled by a user. For instance, the conductors may have a natural twist imparted upon them as they are pulled from container 402. This natural twist may cause portions of the conductors to rest against the inner surface of wire guide 2112. The friction between the conductors and the inner surface may hinder the conductors from falling back into container 402. Wire guide 2112 may also include a lubricant applying member (not shown) that may apply a lubricant to the conductors as they pass through wire guide 2112.

Figure 22:
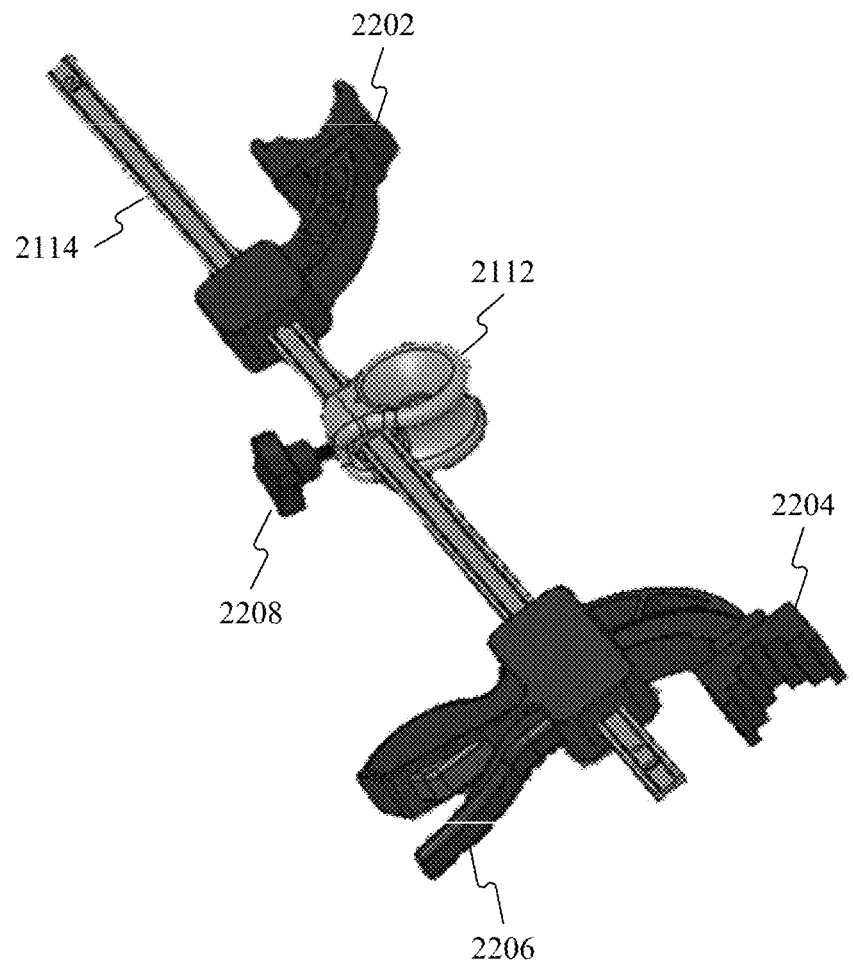
FIG. 22 shows a wire guide.

FIG. 22 shows wire guide 2112 connected to horizontal support 2114. Horizontal support 2114 may be connected to a first end clamp 2202 and a second end clamp 2204. During use, an electrician may place first end clamp 2202 against first side 2108 and second end clamp 2204 against second side 2110. To secure wire guide 2112 into position, the electrician may squeeze a trigger 2206. Squeezing trigger 2206 may cause the distance between first end clamp 2202 and second end clamp 2204 to increase. The increased distance may increase pressure on first side 2108 and second side 2110. The increase pressure may hold horizontal support 2114 in place. Wire guide 2112 may be secured along horizontal support 2114 via a set screw 2208. Wire guide 2112 may rotate about horizontal support 2114. Wire guide 2112 may also move along an axis normal to horizontal support 2114. Trigger 2206 may allow wire guide 2112 to be installed and removed from panel 2100 without the use of tools.

Figure 23:
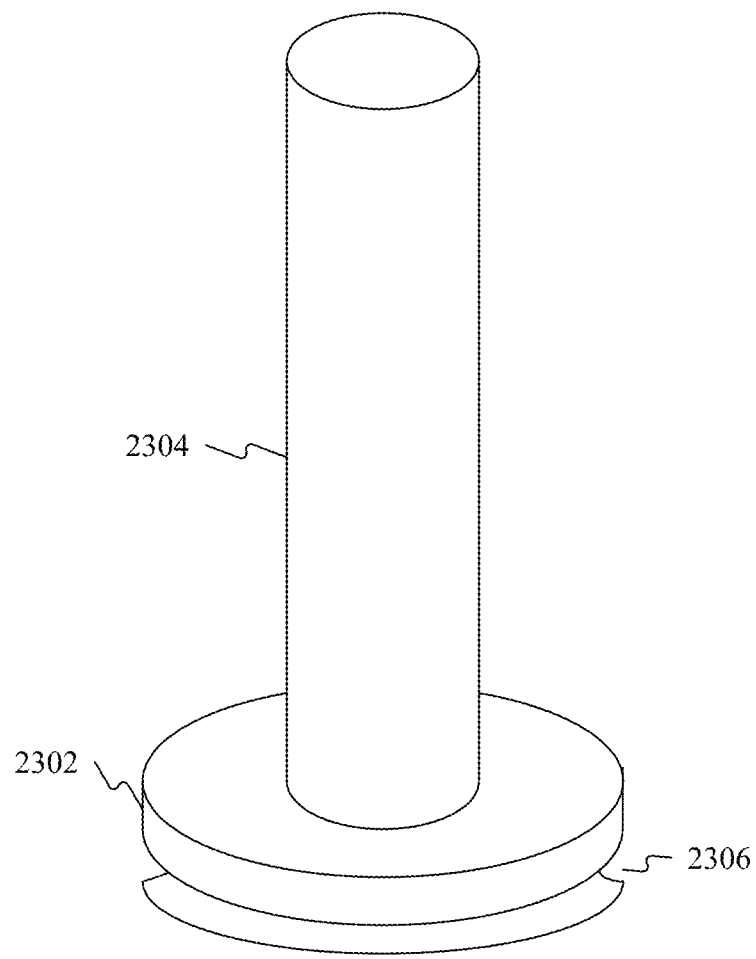
FIG. 23 shows a core.

FIG. 23 shows a core 2300. Core 2300 may comprise a base 2302 and a vertical member 2304. A conductor, or multiple conductors (not shown), may be wound around vertical member 2304. Base 2302 may comprise an indentation 2306. Indentation 2306 may receive lower fork 134 and allow core 2300 to be transported. Core 2300 may be inserted into barrel 402. In addition, wire wound around vertical member 2304 may be covered with a protective member such, for example, cardboard, rubber, plastic, etc.

Throughout this specification cart, hand-lifts and forklift may be used interchangeably. In addition, container and drum may be used interchangeably throughout this specification.

Embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the invention have been described, other embodiments may exist. While the specification includes examples, the invention's scope is indicated by the following claims. Furthermore, while the specification has been described in language specific to structural features, the claims are not limited to the features or acts described above. Rather, the specific features and acts described in the foregoing detailed description are examples and explanatory only, and should not be considered to restrict the invention's scope, as described and claimed.

Embodiments are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

What is claimed is:

1. A cart comprising:
   a first support member;
   a second support member;
   a first angled connection member connected to the first support member, wherein a first end of the first angled connection member is connected at a first end of the first support member, and wherein a second end of the first angled connection member is connected at a first distal point towards a second end of the first support member;
   a second angled connection member connected to the second support member, wherein a first end of the second angled connection member is connected at a first end of the second support member, and wherein a second end of the second angled connection member is connected at a first distal point towards a second end of the second support member;
   a first pair of wheels, wherein a first wheel of the first pair of wheels is connected to the first angled connection member, and wherein a second wheel of the first pair of wheels is connected to the second angled connection member;
   a second pair of wheels, wherein a first wheel of the second pair of wheels is connected to the first angled connection member, and wherein a second wheel of the second pair of wheels is connected to the second angled connection member; and
   a receiving member attached to the first support member through a first sliding member and a second sliding member and to the second support member through a third sliding member and a fourth sliding member, the receiving member being freely slideable in a substantially vertical direction along the first support member and the second support member between the first end of the first support member and the first distal point of the first support member.

2. The cart of claim 1, wherein the receiving member comprises at least one fork configured to receive a container.

3. The cart of claim 2, wherein one or more forks on the receiving member comprise at least one post configured to fit with a ring around a container to receive the container.

4. The cart of claim 2, wherein the at least one fork comprises extendable tines.

5. The cart of claim 1, wherein the receiving member comprises:
   an upper fork configured to receive a container at an upper portion of the container; and
   a lower fork configured to receive the container at a lower portion of the container.

6. The cart of claim 5, wherein the upper fork and the lower fork on the receiving member each comprise at least one post configured to fit with a ring around a container to receive the container.

7. The cart of claim 1, wherein the receiving member is configured to be detached from the cart.

8. The cart of claim 1, wherein the receiving member is configured to receive a container with the use of a locking mechanism.

9. The cart of claim 1, wherein the receiving member has a shape complimentary to a container profile.

10. The cart of claim 1, wherein the receiving member comprises a distinctive cross section configured to receive a container having an indentation comprising a complimentary distinctive cross section.

11. The cart of claim 1, further comprising an electronic display configured to interface with a container and display a property of contents in the container.

12. A cart comprising:
   a first support member;
   a second support member;
   a first angled connection member connected to the first support member, wherein a first end of the first angled connection member is connected at a first end of the first support member, and wherein a second end of the first angled connection member is connected at a first distal point towards a second end of the first support member;
   a second angled connection member connected to the second support member, wherein a first end of the second angled connection member is connected at a first end of the second support member, and wherein a second end of the second angled connection member is connected at a first distal point towards a second end of the second support member;
   a first pair of wheels, wherein a first wheel of the first pair of wheels is connected to the first angled connection member, and wherein a second wheel of the first pair of wheels is connected to the second angled connection member;
   a second pair of wheels, wherein a first wheel of the second pair of wheels is connected to the first angled connection member, and wherein a second wheel of the second pair of wheels is connected to the second angled connection member;
   a receiving member attached to the support member, the receiving member being freely slideable in a substantially vertical direction along the support member; and a wire guide that facilitates removal of at least one conductor from a container.

13. The cart of claim 12, wherein the wire guide is connected to the first support member or the second support member.

14. The cart of claim 12, wherein the wire guide is connected to the receiving member.

15. The cart of claim 12, wherein the position of the wire guide is movable.

16. The cart of claim 12, wherein the wire guide is configured to hinder a conductor from travelling back into a container once the conductor is removed from the container.

17. The cart of claim 12, wherein the wire guide is configured to bind two or more conductors as they are removed from a container.

18. A cart comprising:
a first support member;
a second support member;
a first angled connection member connected to the first support member, wherein a first end of the first angled connection member is connected at a first end of the first support member, and wherein a second end of the first angled connection member is connected at a first distal point towards a second end of the first support member;
a second angled connection member connected to the second support member, wherein a first end of the second angled connection member is connected at a first end of the second support member, and wherein a second end of the second angled connection member is connected at a first distal point towards a second end of the second support member;
a first pair of wheels, wherein a first wheel of the first pair of wheels is connected to the first angled connection member, and wherein a second wheel of the first pair of wheels is connected to the second angled connection member;
a second pair of wheels, wherein a first wheel of the second pair of wheels is connected to the first angled connection member, and wherein a second wheel of the second pair of wheels is connected to the second angled connection member;
receiving means for receiving a container;
support means comprising the first support member and the second support member for supporting the receiving means, the receiving means free floating in a substantially vertical direction on the support means; and
transport means comprising the first pair of wheels and the second pair of wheels, attached to the support means, for allowing the cart to roll.

19. The cart of claim 1, wherein the first sliding member and the second sliding member each fully encircle the first support member.

20. The cart of claim 1, wherein the third sliding member and the fourth sliding member each fully encircle the second support member.

* * * * *